(12) United States Patent
Altonen

(10) Patent No.: US 9,364,977 B2
(45) Date of Patent: Jun. 14, 2016

(54) LOW CONSTANT PRESSURE INJECTION MOLDING SYSTEM WITH VARIABLE-POSITION MOLDING CAVITIES

(71) Applicant: The Procter & Gamble Company, Cincinnati, OH (US)

(72) Inventor: Gene Michael Altonen, West Chester, OH (US)

(73) Assignee: iMFLUX, Inc., Hamilton, OH (US)

( * ) Notice: Subject to any disclaimer, the term of this patent is extended or adjusted under 35 U.S.C. 154(b) by 0 days.

(21) Appl. No.: 14/275,944

(22) Filed: May 13, 2014

(65) Prior Publication Data

US 2014/0335219 A1    Nov. 13, 2014

Related U.S. Application Data

(60) Provisional application No. 61/822,661, filed on May 13, 2013.

(51) Int. Cl.
| | | |
|---|---|---|
| B29C 45/16 | (2006.01) | |
| B29C 45/04 | (2006.01) | |
| B29C 45/26 | (2006.01) | |
| B29C 45/77 | (2006.01) | |
| B29C 33/38 | (2006.01) | |
| B29C 45/73 | (2006.01) | |
| B29C 45/28 | (2006.01) | |

(52) U.S. Cl.
CPC ............ *B29C 45/045* (2013.01); *B29C 33/3828* (2013.01); *B29C 45/2602* (2013.01); *B29C 45/2675* (2013.01); *B29C 45/73* (2013.01); *B29C 45/7337* (2013.01); *B29C 45/77* (2013.01); *B29C 45/16* (2013.01); *B29C 45/2806* (2013.01); *B29C 45/7312* (2013.01); *B29K 2995/0013* (2013.01)

(58) Field of Classification Search
CPC ........................................................ B29C 45/16
USPC ................... 425/130, 574, 575, 576, 547, 552
See application file for complete search history.

(56) References Cited

U.S. PATENT DOCUMENTS

| | | | | |
|---|---|---|---|---|
| 3,914,081 A | * | 10/1975 | Aoki | ............................. 425/130 |
| 5,407,342 A | * | 4/1995 | Boucher et al. | ............... 425/145 |
| 5,419,858 A | | 5/1995 | Hata | |
| 5,728,329 A | | 3/1998 | Guergov | |
| 5,773,049 A | * | 6/1998 | Kashiwa et al. | ............... 425/572 |
| 5,837,301 A | * | 11/1998 | Arnott et al. | ................... 425/574 |
| 5,853,630 A | | 12/1998 | Hettinga | |
| 5,855,935 A | * | 1/1999 | Brent et al. | .................... 425/574 |
| 6,468,458 B1 | * | 10/2002 | Anderson et al. | ............. 264/246 |
| 7,081,222 B2 | | 7/2006 | Gram | |
| 7,150,845 B1 | | 12/2006 | Gram | |

(Continued)

OTHER PUBLICATIONS

PCT International Search Report and Written Opinion for PCT/US2014/034259 dated Aug. 4, 2014.

*Primary Examiner* — Tim Heitbrink
(74) *Attorney, Agent, or Firm* — Charles R. Ware

(57) ABSTRACT

A variable-position mold system with a plurality of injection systems operable to deliver molten material at a substantially constant pressure of between about 6.89 megapascals (1,000 psi) and about 103.42 megapascals (15,000 psi) to a set of mold cavities of at least one multi-cavity injection mold insert when in fluid communication therewith. The multi-cavity injection mold inserts have a thermal conductivity of greater than 30 BTU/HR FT ° F., and have little or no cooling channels therein.

9 Claims, 27 Drawing Sheets

(56) References Cited

U.S. PATENT DOCUMENTS

| | | |
|---|---|---|
| 7,320,591 B2 | 1/2008 | Gram |
| 7,361,011 B2 | 4/2008 | Gram |
| 7,452,202 B2 | 11/2008 | Gram |
| 7,497,676 B2 | 3/2009 | Gram |
| 7,578,668 B2 | 8/2009 | Hutchinson |
| 7,585,447 B2 | 9/2009 | Gram |
| 7,608,212 B2 | 10/2009 | Gram |
| 7,670,125 B2 * | 3/2010 | Armbruster .................. 425/123 |
| 7,871,260 B2 * | 1/2011 | Boucherie .................... 425/548 |
| 8,124,156 B2 * | 2/2012 | Axelrod et al. ............... 426/512 |
| 8,182,262 B2 * | 5/2012 | Steinebrunner et al. ...... 425/572 |
| 2005/0170114 A1 | 8/2005 | Hill |
| 2011/0316196 A1 | 12/2011 | Altonen |
| 2012/0291885 A1 | 11/2012 | Altonen et al. |
| 2012/0292823 A1 | 11/2012 | Altonen et al. |
| 2012/0294963 A1 | 11/2012 | Altonen et al. |
| 2012/0295049 A1 | 11/2012 | Altonen et al. |
| 2012/0295050 A1 | 11/2012 | Altonen et al. |
| 2013/0069280 A1 | 3/2013 | Altonen et al. |
| 2013/0113131 A1 | 5/2013 | Altonen et al. |
| 2013/0221572 A1 | 8/2013 | Berg, Jr. et al. |
| 2013/0221575 A1 | 8/2013 | Altonen et al. |
| 2013/0224327 A1 | 8/2013 | Altonen et al. |
| 2013/0295219 A1 | 11/2013 | Neufarth et al. |
| 2014/0331701 A1 * | 11/2014 | James ............................ 62/115 |

* cited by examiner

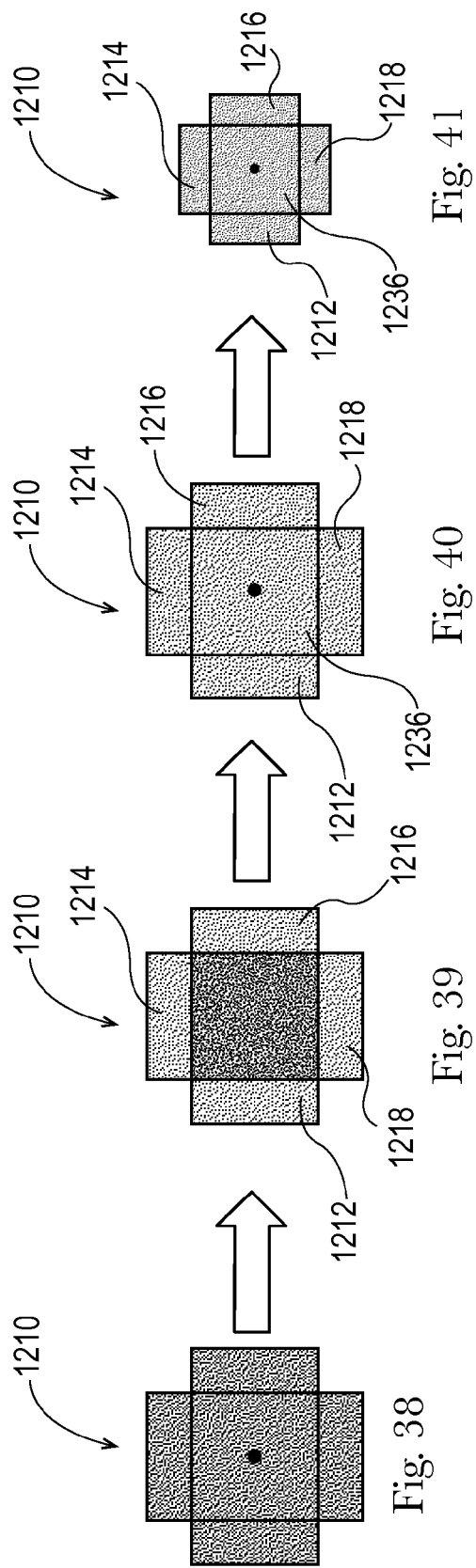

LOW CONSTANT PRESSURE INJECTION MOLDING SYSTEM WITH VARIABLE-POSITION MOLDING CAVITIES

TECHNICAL FIELD

The present invention relates to injection molding machines and methods of producing injection molded parts and, more particularly, to low constant pressure injection molding machines and methods for producing injection molded parts at low constant injection pressures.

BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. A molded part may have one or more gates. It is common for large parts to have two, three, or more gates to reduce the flow distance the polymer must travel to fill the molded part. The one or multiple gates per cavity may be located anywhere on the part geometry, and possess any cross-section shape such as being essentially circular or be shaped with an aspect ratio of 1.1 or greater. Thus, a typical injection molding procedure comprises four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold.

During the injection molding process, the molten plastic resin is injected into the mold cavity and the plastic resin is forcibly injected into the cavity by the injection molding machine until the plastic resin reaches the location in the cavity furthest from the gate. Thereafter, the plastic resin fills the cavity from the end back towards the gate. The resulting length and wall thickness of the part is a result of the shape of the mold cavity.

In some cases, it may be desirous to reduce the wall thickness of injected molded parts to reduce the plastic content, and thus cost, of the final part. Reducing wall thickness using a conventional high variable pressure injection molding process can be an expensive and a non-trivial task. In fact, conventional high variable pressure injection molding machines have a practical limit as to how thin walls of a part may be molded. Generally speaking, conventional high variable pressure injection molding machines cannot mold parts having a thinwall ratio (as defined by an L/T ratio set forth below) of greater than about 200. Furthermore, molding thinwall parts with thinwall ratios of more than 100 requires pressures at the high end of current capability and thus, presses that are capable of handling these high pressures.

When filling a thinwall part, the current industry practice is to fill the mold cavity at the highest possible rate the molding machine can achieve. This approach ensures that the mold cavity is filled before the polymer solidifies or "freezes off" in the mold, and provides the lowest possible cycle time since the polymer is exposed to the cooled mold cavity as quickly as possible. This approach has two drawbacks. The first is that to achieve very high filling velocities requires very high power loads, and this requires very expensive molding equipment. Further, most electric presses are unable to provide sufficient power to achieve these high filling rates, or require very complicated and expensive drive systems that substantially increase the cost of the molding equipment making them impractical economically.

The second drawback is that the high filling rates require very high pressures. These high pressures result in the need for very high clamping forces to hold the mold closed during filling, and these high clamping forces result in very expensive molding equipment. The high pressures also require injection mold cores that are made from very high strength materials, typically hardened tool steels. These high strength molds are also very expensive, and can be impractical economically for many molded components. Even with these substantial drawbacks, the need for thinwall injection molded components remains high, since these components use less polymer material to form the molded part, thereby resulting in material savings that more than offset the higher equipment costs. Further, some molded components require very thin design elements to perform properly, such as design elements that need to flex, or design elements that must mate with very small features of other design elements.

As a liquid plastic resin is introduced into an injection mold in a conventional high variable pressure injection molding process the material adjacent to the walls of the cavity, immediately begins to "freeze," or solidify, or cure, or in the case of crystalline polymers the plastic resin begins to crystallize, because the liquid plastic resin cools to a temperature below the material's no flow temperature and portions of the liquid plastic become stationary. This frozen material adjacent to the walls of the mold narrows the flow path that the thermoplastic travels as it progresses to the end of the mold cavity. The thickness of the frozen material layer adjacent to the walls of the mold increases as the filling of the mold cavity progresses, this causes a progressive reduction in the cross sectional area the polymer must flow through to continue to fill the mold cavity. As material freezes, it also shrinks, pulling away from the mold cavity walls, which reduces effective cooling of the material by the mold cavity walls. As a result, conventional high variable pressure injection molding machines fill the mold cavity with plastic very quickly and then maintain a packing pressure to force the material outward against the sides of the mold cavity to enhance cooling and to maintain the correct shape of the molded part. Conventional high variable pressure injection molding machines typically have cycle times made up of about 10% injection time, about 50% packing time, and about 40% cooling time.

As plastic freezes in the mold cavity, conventional high variable pressure injection molding machines increase injection pressure (to maintain a substantially constant volumetric flow rate due to the smaller cross-sectional flow area). Increasing the pressure, however, has both cost and performance downsides. As the pressure required to mold the component increases, the molding equipment must be strong enough to withstand the additional pressure, which generally equates to being more expensive. A manufacturer may have to purchase new equipment to accommodate these increased pressures. Thus, a decrease in the wall thickness of a given part can result in significant capital expenses to accomplish the manufacturing via conventional injection molding techniques.

In an effort to avoid some of the drawbacks mentioned above, many conventional injection molding operations use shear-thinning plastic material to improve flow characteristics of the plastic material into the mold cavity. As the shear-thinning plastic material is injected into the mold cavity, shear forces generated between the plastic material and the mold cavity walls tend to reduce viscosity of the plastic material, thereby allowing the plastic material to flow more freely and easily into the mold cavity. As a result, it is possible to fill thinwall parts fast enough to avoid the material completely freezing off before the mold is completely filled.

Reduction in viscosity is directly related to the magnitude of shear forces generated between the plastic material and the feed system, and between the plastic material and the mold cavity wall. Thus, manufacturers of these shear-thinning materials and operators of injection molding systems have been driving injection molding pressures higher in an effort to increase shear, thus reducing viscosity. Typically, high output injection molding systems (e.g., class 101 and class 30 systems) inject the plastic material in to the mold cavity at melt pressures of typically 15,000 psi or more. Manufacturers of shear-thinning plastic material teach injection molding operators to inject the plastic material into the mold cavities above a minimum melt pressure. For example, polypropylene resin is typically processed at higher pressures. Press manufacturers and processing engineers typically recommend processing shear thinning polymers at the top end of the range, or significantly higher, to achieve maximum potential shear thinning, which is typically greater than 15,000 psi, to extract maximum thinning and better flow properties from the plastic material. Shear thinning thermoplastic polymers generally are processed at higher pressures. Even with the use of shear thinning plastics, a practical limit exists for high variable pressure injection molding of thin walled parts. This limit is currently in the range of thinwall parts having a thinwall ratio of 200 or more. Moreover, even parts having a thinwall ratio of between 100 and 200 may become cost prohibitive as these parts generally require injection pressures between about 15,000 psi and about 20,000 psi.

High production injection molding machines (i.e., class 101 and class 30 molding machines) that produce thinwalled consumer products exclusively use molds having a majority of the mold made from high hardness materials. High production injection molding machines typically experience 500,000 cycles per year or more. Industrial quality production molds must be designed to withstand at least 500,000 cycles per year, preferably more than 1,000,000 cycles per year, more preferably more than 5,000,000 cycles per year, and even more preferably more than 10,000,000 cycles per year. These machines have multi cavity molds and complex cooling systems to increase production rates. The high hardness materials are more capable of withstanding the repeated high pressure clamping operations than lower hardness materials. However, high hardness materials, such as most tool steels, have relatively low thermal conductivities, generally less than 20 BTU/HR FT ° F., which leads to long cooling times as heat is transferred through from the molten plastic material through the high hardness material.

Even with the ever increasing injection pressure ranges of existing high variable pressure injection molding machines, a practical limit remains of about 200 (L/T ratio) for molding thinwalled parts in conventional high (e.g., 20,000 psi) variable pressure injection molding machines and thinwall parts having a thinwall ratio of between about 100 and about 200 may be cost prohibitive for many manufacturers.

Injection Molding Systems Employing Variable-Position Molding Cavities

Increased complexity in an injection molded product's geometry or composition can require additional operations in the product's manufacture. For instance, products with multiple layers of plastic (e.g., different color), products with actuable parts (e.g., hingedly-connected or force-fit lids or caps) or products with integral details such as logo plates, require multiple injection mold shot cycles or other processing beyond a single injection mold shot cycle.

Many injection molded products, even those having complex geometry or composition, are conducive to being manufactured in multi-cavity molds that permit multiple quantities of the product to be molded simultaneously. Various developments have been made in an effort to increase manufacturing capacity and decrease cycle time of multi-cavity injection molding systems for products requiring multiple shots or other processing beyond a single injection mold shot cycle.

One type of system for molding parts requiring two or more shots of plastic involves a core back approach in which after a first injection molding shot is completed, a portion of a steel (or some other metallurgy, such as beryllium copper) mold immediately adjacent the mold cavity (or cavities) is partially pulled back, then a second injection molded shot is initiated. Once that second shot is completed, the mold is fully opened and the molded products may then be ejected.

Other systems for efficiently performing multiple injection molded shots or other operations to a multiple-cavity mold is to provide a mold having mold cavities that are variably-positionable. One such variably-positionable mold system employs a plate-mounted multi-cavity mold that is rotatable along a horizontal axis in a direction of a machine axis of the injection molding system. The injection molding system may have a first injection mold feed system (the first injection mold feed system including a first plastic resin source, a first screw, a first nozzle, and a first set of sprue gates for injection molding a shot of a first plastic material into a subset of the entire number of cavities of the multi-cavity mold), and a second injection mold feed system (the second injection mold feed system including a second plastic resin source, a second screw, a second nozzle, and a second set of sprue gates for injection molding a shot of a second plastic material into a subset of the entire number of cavities of the multi-cavity mold). The first injection mold feed system may be arranged such that the first set of sprue gates is alignable with mold cavities in an upper half of the mold, and the second mold feed system may be arranged such that the second set of sprue gates is alignable with mold cavities in a lower half of the mold. In use, the multi-cavity mold rotates from a first position, wherein a subset of the entire number of cavities of the multi-cavity mold is aligned with the first set of sprue gates of the first injection mold feed system to receive a shot of the first plastic material, to a second position, wherein that same subset of the entire number of cavities of the multi-cavity mold is brought into alignment with the second set of sprue gates of the second injection mold feed system to receive a shot of the second plastic material. The mold might rotate through 180° from the first position to the second position. While the second injection mold feed system is performing the shot of the second plastic material, the first injection mold feed system may simultaneously be performing a shot of the first plastic material on another subset of the entire number of cavities of the multi-cavity mold, which subset was out of alignment with the first set of sprue gates prior to rotation of the mold.

Alternately, in what is sometimes referred to as a "helicopter" shot injection mold system, the respective sprue gates of the first and second injection mold feed systems may be arranged relative to the mold such that the mold rotates through only 120° from the first position to the second position, and after the subset of the entire number of cavities of the multi-cavity mold receives the shot of the second plastic material, the mold rotates another 120° to a third position, at which a third injection mold feed system may perform a shot of a third plastic material, or alternately, an ejector may eject products from that subset of the entire number of cavities of the multi-cavity mold or some other processing operation could be performed. In such a system, each of the injection mold feed systems can continually run each time a subset of the entire number of cavities of the multi-cavity mold is brought into alignment with the sprue gates of that injection mold feed system, such that while one subset of the cavities of the multi-cavity mold is receiving its third shot of plastic material, another subset of the cavities is receiving its second shot of material, and yet another subset of the cavities is receiving its first shot of plastic material. In a helicopter mold system, the mold could stop at any desired number of locations around the horizontal axis about which it rotates.

Another variably-positionable mold system involves a mold rotatable about a vertical axis, the mold including a plurality of faces, each of which includes multiple mold cavities. For instance, a single cube mold system includes a four-faced mold, each of the four faces including multiple mold cavities. While each of the faces of a cube mold may each be square, having equal length and height, the faces may alternately be of any rectangular shape, such that the mold has four sides, but is not a true cube. The cube mold may be operated to rotate at 180° intervals so that opposed faces of the cube mold alternate between being in registration with a first injection side (at which a first injection shot is performed) and a second injection side (at which a second injection shot is performed). The cube mold may be operated to rotate at 90° intervals, so that operations might occur not only on opposing faces that are in alignment with first and second molding stations along a machine axis, but simultaneously on other faces of that same cube mold, further operations, such as a third injection mold shot, ejection, or cooling, can take place at the positions orthogonal to the first and second molding stations. In conventional high pressure cube mold systems where the operation being performed at a face of the cube mold orthogonal to the machine axis is a third mold operation, because that third injection shot takes place at high pressure, it is necessary to provide a strong clamping mechanism external to the cube that applies a mechanical wedge or lock that serves to wedge or trap together the plates in the face of the cube immediately facing that third molding station. While this clamping is not necessary for the faces of the cube mold along the machine axis, i.e. the axis along which the first and second molding stations are disposed in an opposing to one another, because as the system closes, the forces of the two opposing first and second injection molding stations serve to balance one another, since there is no off-setting mold opposing the third injection shot, the clamping pressure to secure the mold halves together on the third molding face must be provided by one or more additional mechanisms to achieve the wedge or lock. The mechanism(s) could be tied in to the press tie bars to provide a secure anchor point to generate the required clamping force. The capacity of the third mold shot is also lower than that of the first and second mold shots because of the pressures and limited ability to asymmetrically clamp the plates in the face exposed to that third molding station. It is recognized that the third shot can sequentially be introduced to a given set of mold cavities earlier in time than the second shot, since the third injection molding station is arranged intermediate the first and second injection molding stations, so the designation of "first", "second", or "third" as used herein is not intended to denote a particular order of operations, absent a specific additional indication that a particular of operations is intended.

The total cycle time for a variably-positionable mold system such as a single cube mold system is the total time for an entire revolution of the cube mold, including the duration of operations performed on cavities in the faces of the cube when the cube mold is stationary, as well as the time necessary to rotate the cube mold between the successive positions. In the case of a cube mold operated to rotate at 90° intervals, the total cycle time would include the time required for four rotations of the cube mold, plus four times the longest processing operation while the mold is stationary. The duration of the longest processing operation performed while the cube mold is stationary will define the cycle time on each mold face, because with operations being performed on different faces of the cube mold simultaneously, the cube mold must wait until the longest processing operation performed on cavities in any of the faces is completed before the cube mold may be rotated to advance the mold cavities in each of the faces to the next station about the perimeter of the cube mold. For instance, if a first molding station requires a longer period of time to perform an injection mold shot that a second molding station on an opposite side of the cube mold, such that the second molding station completes the second shot into mold cavities on the face of the cube mold immediately facing the second molding station before the first molding station completes the first shot into the mold cavities on the face of the cube mold immediately facing the first molding station, the cube mold is not rotated (i.e., advanced) until that first molding station completes the first shot.

Yet another variably-positionable mold system involves a double cube arrangement. In a double cube mold system, multi-cavity mold faces are provided on each side of two adjacent rotatable cube molds. This arrangement is particularly well-suited to automating assembly of multi-part products, since a set of first parts may be injection molded into cavities provided in a face of the first cube mold and a set of second parts may be injection molded into cavities provided in a face of the second cube mold. As the respective faces of the two cube molds are brought into registration with one another in a face-to-face relationship and the two cube molds are pressed together, each of the set of first parts can be forced into a mating relationship with a corresponding one of the set of second parts, such as in an interlocking or force-fit manner.

Variably-positionable injection mold systems have several benefits, such as their ability to increase productivity by increasing molding capacity per mold machine and reduce the time of overall product manufacture. In the case of a single- or double-cube injection molding system, there is also a significant potential reduction in energy costs resulting from reduced clamp tonnage necessary for the conventional high pressure injection molding performed within the mold system. In such a system, satisfaction of the highest clamp tonnage requirement of the two (or more) injection molding feed systems would provide the necessary clamp tonnage for an opposing injection molding feed system.

Because conventional multi-cavity injection molding systems operate at high pressures, it is well understood that it is necessary to employ product-specific mold inserts with high hardness, such as tool steels. These materials exhibit low thermal conductivity and have higher mass relative to lower-mass higher thermal conductivity materials, such as Aluminum. Due to the low thermal conductivity, in order to remove sufficient levels of heat from molded parts for completion of a mold cycle and for further processing or ejection, the use of extensive cooling channels in multi-cavity molds is prevalent. In the case of variably-positionable injection mold systems, the weight of the tool steel (or similar high hardness material) and the cooling channel requirements present limiting factors to the optimization of the dynamic features of the molds. For instance, in a single or dual cube mold system, cycle times must accommodate the time necessary to rotate the cube mold(s) from one position to the next. There are also significant energy requirements to actuate the heavy cubes between positions, as well as maintenance concerns to keep such actuation machinery in good working condition.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 25 illustrates that the lack of cooling channels within the product-specific mold inserts associated with the mold cavities permits the mold cavities to be disposed in closer proximity to one another than the mold cavities of the conventional multi-cavity mold illustrated in FIG. 24, with the overall length and height dimensions of the mold of FIG. 25 being less than overall length and height dimensions of the mold of FIG. 24;

FIG. 26 illustrates that the lack of cooling channels within the product-specific mold inserts associated with the mold cavities permits the mold cavities to be disposed in closer proximity to one another than the mold cavities of the conventional multi-cavity mold illustrated in FIG. 14, thereby permitting a greater total number of mold cavities in a mold having the same length and height dimensions as the conventional multi-cavity mold illustrated in FIG. 24;

FIG. 38 is a top view of a multi-faced cube mold with all mold faces and central rotatable section made of a low thermal conductivity metal, such as tool steel, with dark shading indicating relatively high mass metal;

FIG. 39 is a top view of a multi-faced cube mold with mold faces made of metal having a high thermal conductivity, such as Aluminum, with light shading indicating relative low mass metal;

FIG. 40 is a top view of a multi-faced cube mold with not only mold faces being made of metal having a high thermal conductivity, but with its central rotatable section also made of metal having a high thermal conductivity, with light shading indicating relative low mass metal; and FIG. 41 is a top view of a multi-faced cube mold with both its mold faces and central rotatable section made of metal having a high thermal conductivity and, due to minimization or elimination of cooling channels, a reduced overall footprint as compared to the multi-faced cube mold of FIG. 40.

DETAILED DESCRIPTION

Figure 1:
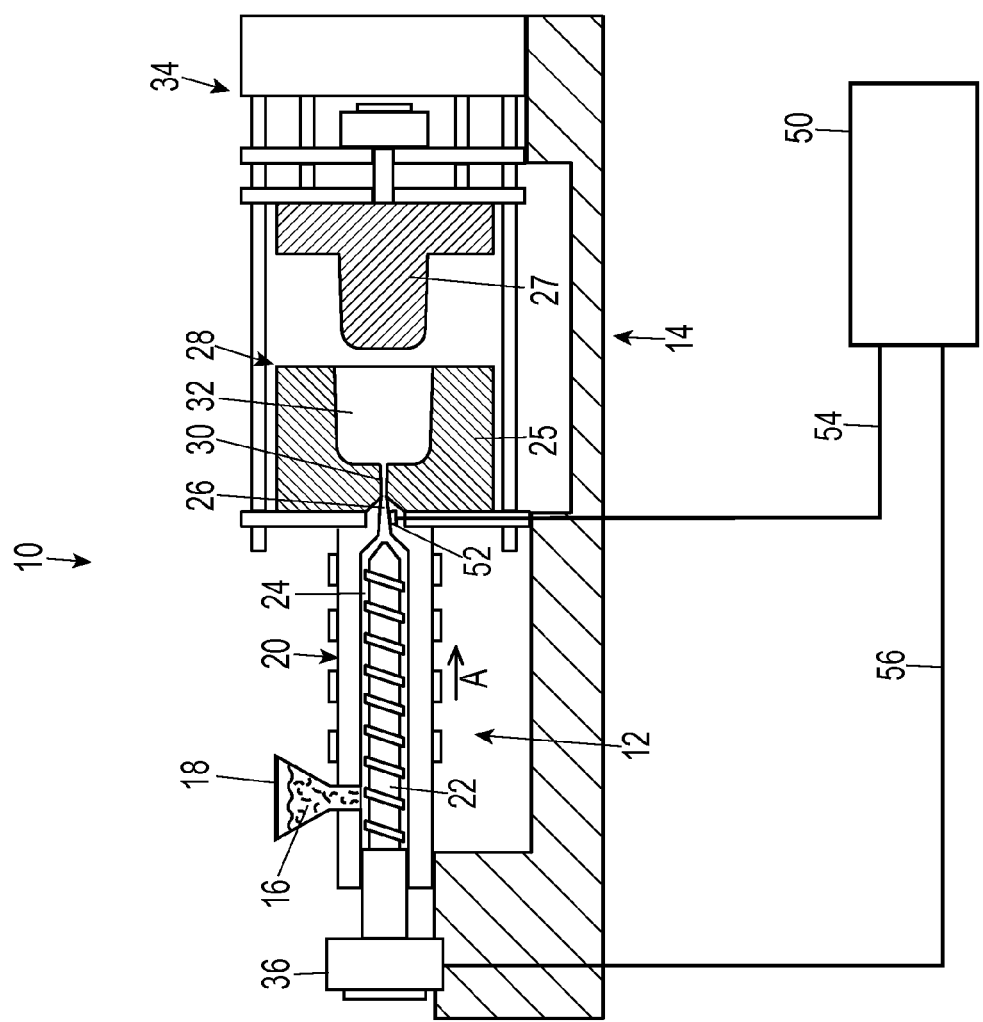
FIG. 1 illustrates a schematic view of a low constant pressure injection molding machine constructed according to the disclosure.

Embodiments of the present invention generally relate to systems, machines, products, and methods of producing products by injection molding and more specifically to systems, products, and methods of producing products by low substantially constant pressure injection molding.

The term "low pressure" as used herein with respect to melt pressure of a thermoplastic material, means melt pressures in a vicinity of a nozzle of an injection molding machine of between about 6.89 megapascals (1,000 psi) and about 103.42 megapascals (15,000 psi). However, it is contemplated that, in various embodiments of the present disclosure, the melt pressure of a thermoplastic material can be any integer value for megapascals or psi between these values, or any range formed by any of those integer values, such as, for example, ranges with a lower limit of 13.79 megapascals (2,000 psi) or 20.68 megapascals (3,000 psi), and/or ranges with an upper limit of 82.74 megapascals (12,000 psi) or 68.95 megapascals (10,000 psi) or 55.16 megapascals (8,000 psi) or 41.37 megapascals (6,000 psi), etc.

The term "substantially constant pressure" as used herein with respect to a melt pressure of a thermoplastic material, means that deviations from a reference melt pressure do not produce meaningful changes in physical properties of the thermoplastic material. For example, "substantially constant pressure" includes, but is not limited to, pressure variations for which viscosity of the melted thermoplastic material do not meaningfully change. The term "substantially constant" in this respect includes deviations of approximately +/−30% from a reference melt pressure. For example, the term "a substantially constant pressure of approximately 4,600 psi" includes pressure fluctuations within the range of about 6,000 psi (30% above 4,600 psi) to about 3,200 psi (30% below 4,600 psi). A melt pressure is considered substantially constant as long as the melt pressure fluctuates no more than +/−30% from the recited pressure. However, it is contemplated that, in various embodiments of the present disclosure, the variation of a reference melt pressure can be any integer value for percentage between −30% and +30% or any range formed by any of those integer percentage values, such as, for example, ranges with a variation lower limit of 0%, +/−5%, or +/−10%, and/or ranges with a variation upper limit of +/−25%, +/−20%, or +/−15%, with the possibility that the variations may be only positive variation, or only negative variation, or a combination of both positive and negative variation.

The term "melt holder", as used herein, refers to the portion of an injection molding machine that contains molten plastic in fluid communication with the machine nozzle. The melt holder is heated, such that a polymer may be prepared and held at a desired temperature. The melt holder is connected to a power source, for example a hydraulic cylinder or electric servo motor, that is in communication with a central control unit, and can be controlled to advance a diaphragm to force molten plastic through the machine nozzle. The molten material then flows through the runner system in to the mold cavity. The melt holder may be cylindrical in cross section, or have alternative cross sections that will permit a diaphragm to force polymer under pressures that can range from as low as 100 psi to pressures 40,000 psi or higher through the machine nozzle. The diaphragm may optionally be integrally connected to a reciprocating screw with flights designed to plasticize polymer material prior to injection.

The term "high L/T ratio" generally refers to L/T ratios of 100 or greater, and more specifically to L/T ratios of 200 or greater, but less than 1000. Calculation of the L/T ratio is defined below.

The term "peak flow rate" generally refers to the maximum volumetric flow rate, as measured at the machine nozzle.

The term "peak injection rate" generally refers to the maximum linear speed the injection ram travels in the process of forcing polymer in to the feed system. The ram can be a reciprocating screw such as in the case of a single stage injection system, or a hydraulic ram such as in the case of a two stage injection system.

The term "ram rate" generally refers to the linear speed the injection ram travels in the process of forcing polymer into the feed system.

The term "flow rate" generally refers to the volumetric flow rate of polymer as measured at the machine nozzle. This flow rate can be calculated based on the ram rate and ram cross sectional area, or measured with a suitable sensor located in the machine nozzle.

The term "cavity percent fill" generally refers to the percentage of the cavity that is filled on a volumetric basis. For example, if a cavity is 95% filled, then the total volume of the mold cavity that is filled is 95% of the total volumetric capacity of the mold cavity.

The term "melt temperature" generally refers to the temperature of the polymer that is maintained in the melt holder, and in the material feed system when a hot runner system is used, which keeps the polymer in a molten state. The melt temperature varies by material, however, a desired melt temperature is generally understood to fall within the ranges recommended by the material manufacturer.

The term "gate size" generally refers to the cross sectional area of a gate, which is formed by the intersection of the runner and the mold cavity. For hot runner systems, the gate can be of an open design where there is no positive shut off of the flow of material at the gate, or a closed design where a valve pin is used to mechanically shut off the flow of material through the gate in to the mold cavity (commonly referred to as a valve gate). The gate size refers to the cross sectional area, for example a 1 mm gate diameter refers to a cross sectional area of the gate that is equivalent to the cross sectional area of a gate having a 1 mm diameter at the point the gate meets the mold cavity. The cross section of the gate may be of any desired shape.

The term "effective gate area" generally refers to a cross sectional area of a gate corresponding to an intersection of the mold cavity and a material flow channel of a feed system (e.g., a runner) feeding thermoplastic to the mold cavity. The gate could be heated or not heated. The gate could be round, or any cross sectional shape, suited to achieve the desired thermoplastic flow into the mold cavity.

The term "intensification ratio" generally refers to the mechanical advantage the injection power source has on the injection ram forcing the molten polymer through the machine nozzle. For hydraulic power sources, it is common that the hydraulic piston will have a 10:1 mechanical advantage over the injection ram. However, the mechanical advantage can range from ratios much lower, such as 2:1, to much higher mechanical advantage ratio such as 50:1.

The term "peak power" generally refers to the maximum power generated when filling a mold cavity. The peak power may occur at any point in the filling cycle. The peak power is determined by the product of the plastic pressure as measured at the machine nozzle multiplied by the flow rate as measured at the machine nozzle. Power is calculated by the formula $P=p*Q$ where p is pressure and Q is volumetric flow rate.

The term "volumetric flow rate" generally refers to the flow rate as measured at the machine nozzle. This flow rate can be calculated based on the ram rate and ram cross sectional area, or measured with a suitable sensor located in the machine nozzle.

The terms "filled" and "full," when used with respect to a mold cavity including thermoplastic material, are interchangeable and both terms mean that thermoplastic material has stopped flowing into the mold cavity.

The term "shot size" generally refers to the volume of polymer to be injected from the melt holder to completely fill the mold cavity or cavities. The Shot Size volume is determined based on the temperature and pressure of the polymer in the melt holder just prior to injection. In other words, the shot size is a total volume of molten plastic material that is injected in a stroke of an injection molding ram at a given temperature and pressure. Shot size may include injecting molten plastic material into one or more injection cavities through one or more gates. The shot of molten plastic material may also be prepared and injected by one or more melt holders.

The term "hesitation" generally refers to the point at which the velocity of the flow front is minimized sufficiently to allow a portion of the polymer to drop below its no flow temperature and begin to freeze off.

The term "electric motor" or "electric press," when used herein includes both electric servo motors and electric linear motors.

The term "Peak Power Flow Factor" refers to a normalized measure of peak power required by an injection molding system during a single injection molding cycle and the Peak Power Flow Factor may be used to directly compare power requirements of different injection molding systems. The Peak Power Flow Factor is calculated by first determining the Peak Power, which corresponds to the maximum product of molding pressure multiplied by flow rate during the filling cycle (as defined herein), and then determining the Shot Size for the mold cavities to be filled. The Peak Power Flow Factor is then calculated by dividing the Peak Power by the Shot Size.

The term "low constant pressure injection molding machine" is defined as a class 101 or a class 30 injection molding machine that uses a substantially constant injection pressure that is also a low pressure, as defined herein. Alternatively, the term "low constant pressure injection molding machine" may be defined as an injection molding machine that uses a substantially constant, low injection pressure and that is capable of performing more than 1 million cycles, preferably more than 1.25 million cycles, more preferably more than 2 million cycles, more preferably more than 5 million cycles, and even more preferably more than 10 million cycles before the mold core (which is made up of first and second mold parts that define a mold cavity therebetween) reaches the end of its useful life. Characteristics of "low constant pressure injection molding machines" include mold cavities having an L/T ratio of greater than 100 (and preferably greater than 200), multiple mold cavities (preferably 4 mold cavities, more preferably 16 mold cavities, more preferably 32 mold cavities, more preferably 64 mold cavities, more preferably 128 mold cavities and more preferably 256 mold cavities, or any number of mold cavities between 4 and 512), a heated runner, and a guided ejection mechanism.

The term "useful life" is defined as the expected life of a mold part before failure or scheduled replacement. When used in conjunction with a mold part or a mold core (or any part of the mold that defines the mold cavity), the term "useful life" means the time a mold part or mold core is expected to be in service before quality problems develop in the molded part, before problems develop with the integrity of the mold part (e.g., galling, deformation of parting line, deformation or excessive wear of shut-off surfaces), or before mechanical failure (e.g., fatigue failure or fatigue cracks) occurs in the mold part. Typically, the mold part has reached the end of its "useful life" when the contact surfaces that define the mold cavity must be discarded or replaced. The mold parts may require repair or refurbishment from time to time over the "useful life" of a mold part and this repair or refurbishment does not require the complete replacement of the mold part to achieve acceptable molded part quality and molding efficiency. Furthermore, it is possible for damage to occur to a mold part that is unrelated to the normal operation of the mold part, such as a part not being properly removed from the mold and the mold being force ably closed on the non-ejected part, or an operator using the wrong tool to remove a molded part and damaging a mold component. For this reason, spare mold parts are sometimes used to replace these damaged components prior to them reaching the end of their useful life. Replacing mold parts because of damage does not change the expected useful life.

The term "guided ejection mechanism" is defined as a dynamic part that actuates to physically eject a molded part from the mold cavity.

The term "coating" is defined as a layer of material less than 0.13 mm (0.005 in) in thickness, that is disposed on a surface of a mold part defining the mold cavity, that has a primary function other than defining a shape of the mold cavity (e.g., a function of protecting the material defining the mold cavity, or a function of reducing friction between a molded part and a mold cavity wall to enhance removal of the molded part from the mold cavity).

The term "average thermal conductivity" is defined as the thermal conductivity of any materials that make up the mold cavity or the mold side or mold part. Materials that make up coatings, stack plates, support plates, and gates or runners, whether integral with the mold cavity or separate from the mold cavity, are not included in the average thermal conductivity. Average thermal conductivity is calculated on a volume weighted basis.

The term "effective cooling surface" is defined as a surface through which heat is removed from a mold part. One example of an effective cooling surface is a surface that defines a channel for cooling fluid from an active cooling system. Another example of an effective cooling surface is an outer surface of a mold part through which heat dissipates to the atmosphere. A mold part may have more than one effective cooling surface and thus may have a unique average thermal conductivity between the mold cavity surface and each effective cooling surface.

The term "nominal wall thickness" is defined as the theoretical thickness of a mold cavity if the mold cavity were made to have a uniform thickness. The nominal wall thickness may be approximated by the average wall thickness. The nominal wall thickness may be calculated by integrating length and width of the mold cavity that is filled by an individual gate.

The term "average hardness" is defined as the Rockwell hardness for any material or combination of materials in a desired volume. When more than one material is present, the average hardness is based on a volume weighted percentage of each material. Average hardness calculations include hardnesses for materials that make up any portion of the mold cavity. Average hardness calculations do not include materials that make up coatings, stack plates, gates or runners, whether integral with a mold cavity or not, and support plates. Generally, average hardness refers to the volume weighted hardness of material in the mold cooling region.

The term "mold cooling region" is defined as a volume of material that lies between the mold cavity surface and an effective cooling surface.

The term "cycle time" is defined as a single iteration of an injection molding process that is required to fully form an injection molded part. Cycle time includes the steps of advancing molten thermoplastic material into a mold cavity, substantially filling the mold cavity with thermoplastic material, cooling the thermoplastic material, separating first and second mold sides to expose the cooled thermoplastic material, removing the thermoplastic material, and closing the first and second mold sides. In the cases of a rotatable mold having mold cavities in multiple faces thereof, or other variable position, multi-shot mold systems, cycle time includes the time necessary for the rotatable mold to rotate through all positions necessary to fully perform all injection molding processes on each face of the mold from first shot through ejection or part removal, as well as the time at each position for the processes at the respective rotatable mold positions to be performed.

Cooling systems of all sorts may be categorized in a system of cooling complexity levels, with cooling complexity level zero representing the most simple cooling system (or no cooling lines or channels at all) and higher cooling complexity levels representing progressively more complex cooling systems. Conventional high productivity consumer product injection molding machines (e.g., class 101 and 102 molding machines) employ complex cooling systems to reduce cycle time and improve productivity. Generally speaking, high productivity consumer product injection molding machines include complex cooling systems (i.e., cooling systems having a level four cooling system complexity level or higher). Level zero to level three cooling complexity level systems generally do not produce cooling capacity that is sufficient for conventional high productivity injection molds, which include molds made of high hardness, low thermal conductivity materials.

Advantageously, the disclosed low constant pressure injection molds include cooling systems having cooling complexity levels of three or less, preferably cooling complexity level three, two, one, or even zero (no cooling channels) which lowers production costs and increases efficiency over conventional high pressure injection molding machines. Cooling complexity level one mold assemblies are defined as containing all active cooling lines within the mold support plates, even if more than one machining axis is needed to form the cooling lines. A cooling complexity level two mold assembly is identical to a cooling complexity level one mold assembly, with the exception that the cooling lines extend through at least one mold support plate and into at least one mold side (i.e., as opposed to the cooling lines only extending through the mold support plates). The cooling lines have terminal ends. However, each cooling line is machined along an axis that is parallel to a single machining axis. The cooling lines may include a baffle, as shown in more detail in FIG. 7, to facilitate cooling fluid flow through the cooling line. Cooling complexity level two mold assemblies have not been used in high output consumer product injection molding machines (i.e., class 101-102 injection molding machines) because cooling complexity level two mold assemblies do not have enough flexibility to machine cooling lines close to the mold surfaces of the mold cavity and therefore, cooling complexity level two mold assemblies do not provide adequate cooling for conventional high output mold assemblies having high hardness, low thermal conductivity molds.

A cooling complexity level three mold assembly is defined by cooling channels having at least two different machining axes. At least one cooling line may include two different machining axes and a terminal end. More particularly, the cooling line may have a bend or turn. For example, the cooling line may include a first machining axis that is substantially parallel to the opening-closing stroke S of the mold assembly and a second machining axis that is angled with respect to the first machining axis Like cooling complexity level two mold assemblies, cooling complexity level three mold assemblies have not been used in high output consumer product injection molding machines (e.g., class 101-102 injection molding machines) because level three cooling complexity does not have enough flexibility to machine cooling lines close to the mold surfaces of the mold cavity and therefore, cooling complexity level three mold assemblies do not provide adequate cooling for conventional high output mold assemblies having high hardness, low thermal conductivity molds.

A cooling complexity level four mold assembly includes a plurality of cooling lines, a first cooling line having a terminal end and a second cooling line being a through-bore without a terminal end. The first cooling line extends from the mold support plate into the first mold side and the second cooling line extends through the first mold side. A machining axis for the first cooling line is different from a machining axis for the second cooling line. In other words, the cooling lines have at least two different machining axes for formation. Cooling complexity level four mold assemblies have been used in some high output consumer product injection molding machines (e.g., class 101-102 injection molding machines) having mold assemblies with very simple mold cavity geometries.

Cooling complexity levels zero through four, and higher cooling complexity levels, are described and illustrated by way of examples in U.S. patent application Ser. No. 13/601,359, which is incorporated herein by reference.

As used herein, a "cooling complexity level zero mold assembly" is defined as a mold assembly that includes no active cooling system. In other words, a cooling complexity level zero mold assembly is only passively cooled through the conduction of heat through the mold sides and through the mold support plates, and eventually to the atmosphere surrounding the mold assembly. Cooling complexity level zero mold assemblies typically have relatively long cycle times (as it takes a significant amount of time for the plastic within the mold to freeze because of the slow cooling rate). As a result, high productivity consumer product mold assemblies (e.g., mold assemblies used in class 101-102 molding machines, or mold assemblies running in larger presses (presses of more than 400 tons), such as class 401-402 molding machines) do not use cooling complexity level zero mold assemblies.

Low constant pressure injection molding machines may also be high productivity injection molding machines (e.g., a class 101 or a class 30 injection molding machine, or an "ultra high productivity molding machine"), such as the high productivity injection molding machine disclosed in U.S. patent application Ser. No. 13/601,514, filed Aug. 31, 2012, which is hereby incorporated by reference herein, that may be used to produce thinwalled consumer products, such as toothbrush handles and razor handles. Thin walled parts are generally defined as having a high L/T ratio of 100 or more.

Referring to the figures in detail, FIG. 1 illustrates an exemplary low constant pressure injection molding apparatus 10 that generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates 30, preferably three or less gates, that direct the flow of the molten thermoplastic material 24 to the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a sensor 52, located in the vicinity of the nozzle 26, and a screw control 36. The controller 50 may include a microprocessor, a memory, and one or more communication links. The controller 50 may also be optionally connected to a sensor 53 located proximate an end of the mold cavity 32. This sensor 32 may provide an indication of when the thermoplastic material is approaching the end of fill in the mold cavity 32. The sensor 32 may sense the presence of thermoplastic material optically, pneumatically, mechanically or otherwise sensing pressure and/or temperature of the thermoplastic material. When pressure or temperature of the thermoplastic material is measured by the sensor 52, this sensor 52 may send a signal indicative of the pressure or the temperature to the controller 50 to provide a target pressure for the controller 50 to maintain in the mold cavity 32 (or in the nozzle 26) as the fill is completed. This signal may generally be used to control the molding process, such that variations in material viscosity, mold temperatures, melt temperatures, and other variations influencing filling rate, are adjusted by the controller 50. These adjustments may be made immediately during the molding cycle, or corrections can be made in subsequent cycles. Furthermore, several signals may be averaged over a number of cycles and then used to make adjustments to the molding process by the controller 50. The controller 50 may be connected to the sensor 52, and/or the sensor 53, and the screw control 36 via wired connections 54, 56, respectively. In other embodiments, the controller 50 may be connected to the sensors 52, 53 and screw control 56 via a wireless connection, a mechanical connection, a hydraulic connection, a pneumatic connection, or any other type of communication connection known to those having ordinary skill in the art that will allow the controller 50 to communicate with both the sensors 52, 53 and the screw control 36.

In the embodiment of FIG. 1, the sensor 52 is a pressure sensor that measures (directly or indirectly) melt pressure of the molten thermoplastic material 24 in vicinity of the nozzle 26. The sensor 52 generates an electrical signal that is transmitted to the controller 50. The controller 50 then commands the screw control 36 to advance the screw 22 at a rate that maintains a desired melt pressure of the molten thermoplastic material 24 in the nozzle 26. While the sensor 52 may directly measure the melt pressure, the sensor 52 may also indirectly measure the melt pressure by measuring other characteristics of the molten thermoplastic material 24, such as temperature, viscosity, flow rate, etc, which are indicative of melt pressure. Likewise, the sensor 52 need not be located directly in the nozzle 26, but rather the sensor 52 may be located at any location within the injection system 12 or mold 28 that is fluidly connected with the nozzle 26. If the sensor 52 is not located within the nozzle 26, appropriate correction factors may be applied to the measured characteristic to calculate an estimate of the melt pressure in the nozzle 26. The sensor 52 need not be in direct contact with the injected fluid and may alternatively be in dynamic communication with the fluid and able to sense the pressure of the fluid and/or other fluid characteristics. If the sensor 52 is not located within the nozzle 26, appropriate correction factors may be applied to the measured characteristic to calculate the melt pressure in the nozzle 26. In yet other embodiments, the sensor 52 need not be disposed at a location that is fluidly connected with the nozzle 26. Rather, the sensor could measure clamping force generated by the clamping system 14 at a mold parting line between the first and second mold parts 25, 27. In one aspect the controller 50 may maintain the pressure according to the input from sensor 52. Alternatively, the sensor could measure an electrical power demand by an electric press, which may be used to calculate an estimate of the pressure in the nozzle.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is an alarm that is activated when an overpressurization condition is detected.

Figure 2:
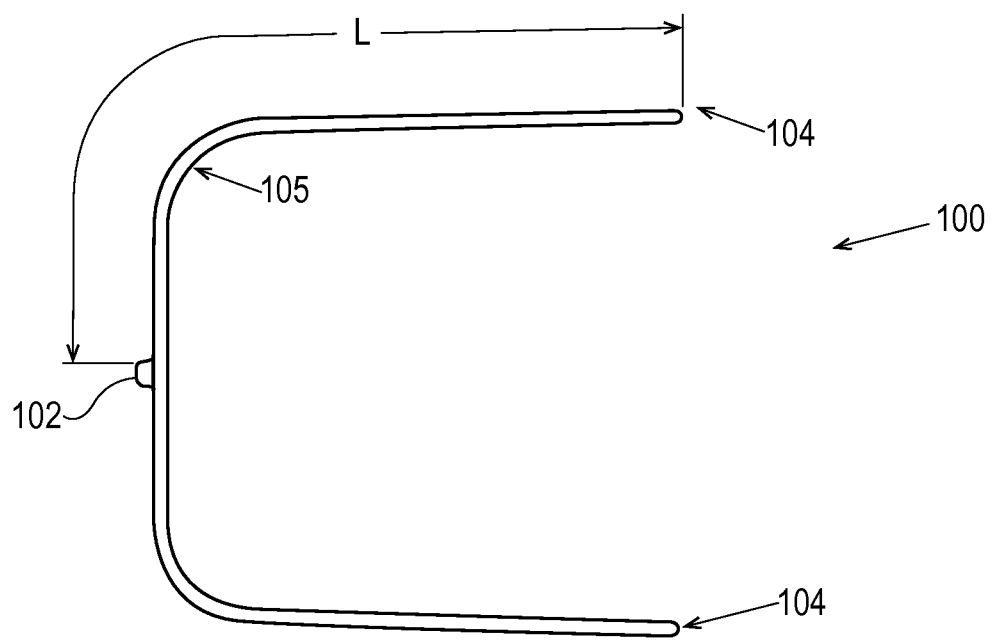
FIG. 2 illustrates one embodiment of a thin-walled part formed in the low constant pressure injection molding machine of FIG. 1.

Turning now to FIG. 2, an example molded part 100 is illustrated. The molded part 100 is a thin-walled part. Molded parts are generally considered to be thin-walled when a length of a flow channel L divided by a thickness of the flow channel T is greater than 100 (i.e., L/T>100), but less than 1000. For mold cavities having a more complicated geometry, the L/T ratio may be calculated by integrating the T dimension over the length of the mold cavity 32 from the gate 30 to the end of the mold cavity 32, and determining the longest length of flow from the gate 30 to the end of the mold cavity 32. The L/T ratio can then be determined by dividing the longest length of flow by the average part thickness. In the case where a mold cavity 32 has more than one gate 30, the L/T ratio is determined by integrating L and T for the portion of the mold cavity 32 filled by each individual gate and the overall L/T ratio for a given mold cavity is the highest L/T ratio that is calculated for any of the gates. In some injection molding industries, thin-walled parts may be defined as parts having an L/T>100, or having an L/T>200, but <1000. The length of the flow channel L is the longest flow length as measured from the gate 30 to the end 104 of the mold cavity. Thin-walled parts are especially prevalent in the consumer products industry.

High L/T ratio parts are commonly found in molded parts having average thicknesses less than about 10 mm. In consumer products, products having high L/T ratios generally have an average thickness of less than about 5 mm. For example, while automotive bumper panels having a high L/T ratio generally have an average thickness of 10 mm or less, tall drinking glasses having a high L/T ratio generally have an average thickness of about 5 mm or less, containers (such as tubs or vials) having a high L/T ratio generally have an average thickness of about 3 mm or less, bottle cap enclosures having a high L/T ratio generally have an average thickness of about 2 mm or less, and individual toothbrush bristles having a high L/T ratio generally have an average thickness of about 1 mm or less. The low constant pressure injection molding processes and devices disclosed herein are particularly advantageous for parts having a thickness of 5 mm or less and the disclosed processes and devices are more advantageous for thinner parts.

Thin-walled parts with high L/T ratios present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material at very high pressures, typically greater than 15,000 psi, so that the molten thermoplastic material rapidly fills the mold cavity before having a chance to cool and freeze off. This is one reason that manufacturers of the thermoplastic materials teach injecting at very high pressures. Another reason traditional injection molding machines inject at high pressures is the increased shear, which increases flow characteristics, as discussed above. These very high injection pressures require the use of very hard materials to form the mold 28 and the feed system, among other things. Moreover, the thin walled parts may include one or more special features 105, such as a living hinge, a filament, a closure, a dispenser, a spout, a bellows, and an actuator, that must be filled before the material freezes.

When filling at a substantially constant pressure, it was generally thought that the filling rates would need to be reduced relative to conventional filling methods. This means the polymer would be in contact with the cool molding surfaces for longer periods before the mold would completely fill. Thus, more heat would need to be removed before filling, and this would be expected to result in the material freezing off before the mold is filled. It has been unexpectedly discovered that the thermoplastic material will flow when subjected to substantially constant pressure conditions despite a portion of the mold cavity being below the no-flow temperature of the thermoplastic material. It would be generally expected by one of ordinary skill in the art that such conditions would cause the thermoplastic material to freeze and plug the mold cavity rather than continue to flow and fill the entire mold cavity. Without intending to be bound by theory, it is believed that the substantially constant pressure conditions of embodiments of the disclosed method and device allow for dynamic flow conditions (i.e., constantly moving melt front) throughout the entire mold cavity during filling. There is no hesitation in the flow of the molten thermoplastic material as it flows to fill the mold cavity and, thus, no opportunity for freeze-off of the flow despite at least a portion of the mold cavity being below the no-flow temperature of the thermoplastic material.

Additionally, it is believed that as a result of the dynamic flow conditions, the molten thermoplastic material is able to maintain a temperature higher than the no-flow temperature, despite being subjected to such temperatures in the mold cavity, as a result of shear heating. It is further believed that the dynamic flow conditions interfere with the formation of crystal structures in the thermoplastic material as it begins the freezing process. Crystal structure formation increases the viscosity of the thermoplastic material, which can prevent suitable flow to fill the cavity. The reduction in crystal structure formation and/or crystal structure size can allow for a decrease in the thermoplastic material viscosity as it flows into the cavity and is subjected to the low temperature of the mold that is below the no-flow temperature of the material.

The disclosed low constant pressure injection molding methods and systems may use a sensor (such as the sensor 53 in FIG. 1 above) located near an end of flow position (i.e., near an end of the mold cavity) to monitor changes in material viscosity, changes in material temperature, and changes in other material properties. Measurements from this sensor may be communicated to the controller to allow the controller to correct the process in real time to ensure the melt front pressure is relieved prior to the melt front reaching the end of the mold cavity, which can cause flashing of the mold, and another pressure and power peak. Moreover, the controller may use the sensor measurements to adjust the peak power and peak flow rate points in the process, so as to achieve consistent processing conditions. In addition to using the sensor measurements to fine tune the process in real time during the current injection cycle, the controller may also to adjust the process over time (e.g., over a plurality of injection cycles). In this way, the current injection cycle can be corrected based on measurements occurring during one or more cycles at an earlier point in time. In one embodiment, sensor readings can be averaged over many cycles so as to achieve process consistency.

In various embodiments, the mold can include a cooling system that maintains the entire mold cavity at a temperature below the no-flow temperature. For example, even surfaces of the mold cavity which contact the shot comprising molten thermoplastic material can be cooled to maintain a lower temperature. Any suitable cooling temperature can be used. For example, the mold can be maintained substantially at room temperature. Incorporation of such cooling systems can advantageously enhance the rate at which the as-formed injection molded part is cooled and ready for ejection from the mold.

Thermoplastic Material:

A variety of thermoplastic materials can be used in the low constant pressure injection molding methods and devices of the disclosure. In one embodiment, the molten thermoplastic material has a viscosity, as defined by the melt flow index of about 0.1 g/10 min to about 500 g/10 min, as measured by ASTM D1238 performed at temperature of about 230 C with a 2.16 kg weight. For example, for polypropylene the melt flow index can be in a range of about 0.5 g/10 min to about 200 g/10 min. Other suitable melt flow indexes include about 1 g/10 min to about 400 g/10 min, about 10 g/10 min to about 300 g/10 min, about 20 to about 200 g/10 min, about 30 g/10 min to about 100 g/10 min, about 50 g/10 min to about 75 g/10 min, about 0.1 g/10 min to about 1 g/10 min, or about 1 g/10 min to about 25 g/10 min. The MFI of the material is selected based on the application and use of the molded article. For examples, thermoplastic materials with an MFI of 0.1 g/10 min to about 5 g/10 min may be suitable for use as preforms for Injection Stretch Blow Molding (ISBM) applications. Thermoplastic materials with an MFI of 5 g/10 min to about 50 g/10 min may be suitable for use as caps and closures for packaging articles. Thermoplastic materials with an MFI of 50 g/10 min to about 150 g/10 min may be suitable for use in the manufacture of buckets or tubs. Thermoplastic materials with an MFI of 150 g/10 min to about 500 g/10 min may be suitable for molded articles that have extremely high L/T ratios such as a thin plate. Manufacturers of such thermoplastic materials generally teach that the materials should be injection molded using higher melt pressures. Contrary to conventional teachings regarding injection molding of such thermoplastic materials, embodiments of the low constant pressure injection molding method and device of the disclosure advantageously allow for forming quality injection molded parts using such thermoplastic materials and processing at low melt pressures.

The thermoplastic material can be, for example, a polyolefin. Exemplary polyolefins include, but are not limited to, polypropylene, polyethylene, polymethylpentene, and polybutene-1. Any of the aforementioned polyolefins could be sourced from bio-based feedstocks, such as sugarcane or other agricultural products, to produce a bio-polypropylene or bio-polyethylene. Polyolefins advantageously demonstrate shear thinning when in a molten state. Shear thinning is a reduction in viscosity when the fluid is placed under compressive stress. Shear thinning can beneficially allow for the flow of the thermoplastic material to be maintained throughout the injection molding process. Without intending to be bound by theory, it is believed that the shear thinning properties of a thermoplastic material, and in particular polyolefins, results in less variation of the materials viscosity when the material is processed at constant pressures. As a result, embodiments of the method and device of the disclosure can be less sensitive to variations in the thermoplastic material, for example, resulting from colorants and other additives as well as processing conditions. This decreased sensitivity to batch-to-batch variations of the properties thermoplastic material can also advantageously allow post-industrial and post consumer recycled plastics to be processed using embodiments of the method and the device of the disclosure. Post-industrial, post consumer recycled plastics are derived from end products that have completed their life cycle as a consumer item and would otherwise have been disposed of as a solid waste product. Such recycled plastic, and blends of thermoplastic materials, inherently have significant batch-to-batch variation of their material properties.

The thermoplastic material can also be, for example, a polyester. Exemplary polyesters include, but are not limited to, polyethylene terphthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly(acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Other additives may include inorganic fillers such calcium carbonate, calcium sulfate, talcs, clays (e.g., nanoclays), aluminum hydroxide, CaSiO3, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically starch and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials such in the examples cited above. As well the different materials may be a combination of materials derived from virgin bio-derived or petroleum-derived materials, or recycled materials of bio-derived or petroleum-derived materials. One or more of the thermoplastic materials in a blend may be biodegradable. And for non-blend thermoplastic materials that material may be biodegradable.

Exemplary thermoplastic resins together with their recommended operating pressure ranges are provided in the following table:

| Material | Full Name | Injection Pressure Range (PSI) | Company | Material Brand Name |
| --- | --- | --- | --- | --- |
| PP | Polypropylene | 10000-15000 | RTP Imagineering Plastics | RTP 100 series Polypropylene |

-continued

| Material | Full Name | Injection Pressure Range (PSI) | Company | Material Brand Name |
| --- | --- | --- | --- | --- |
| Nylon | | 10000-18000 | RTP Imagineering Plastics | RTP 200 series Nylon |
| ABS | Acrylonitrile Butadiene Styrene | 8000-20000 | Marplex | Astalac ABS |
| PET | Polyester | 5800-14500 | Asia International | AIE PET 401F |
| Acetal Copolymer | | 7000-17000 | API Kolon | Kocetal |
| PC | Polycarbonate | 10000-15000 | RTP Imagineering Plastics | RTP 300 series Polycarbonate |
| PS | Polystyrene | 10000-15000 | RTP Imagineering Plastics | RTP 400 series |
| SAN | Styrene Acrylonitrile | 10000-15000 | RTP Imagineering Plastics | RTP 500 series |
| PE | LDPE & HDPE | 10000-15000 | RTP Imagineering Plastics | RTP 700 Series |
| TPE | Thermoplastic Elastomer | 10000-15000 | RTP Imagineering Plastics | RTP 1500 series |
| PVDF | Polyvinylidene Fluoride | 10000-15000 | RTP Imagineering Plastics | RTP 3300 series |
| PTI | Polytrimethylene Terephthalate | 10000-15000 | RTP Imagineering Plastics | RTP 4700 series |
| PBT | Polybutylene Terephthalate | 10000-15000 | RTP Imagineering Plastics | RTP 1000 series |
| PLA | Polylactic Acid | 8000-15000 | RTP Imagineering Plastics | RTP 2099 series |

While more than one of the embodiments involves filling substantially the entire mold cavity with the shot comprising the molten thermoplastic material while maintaining the melt pressure of the shot comprising the molten thermoplastic material at a substantially constant pressure, specific thermoplastic materials benefit from the invention at different constant pressures. Specifically: PP, nylon, PC, PS, SAN, PE, TPE, PVDF, PTI, PBT, and PLA at a substantially constant pressure of less than 10000 psi; ABS at a substantially constant pressure of less than 8000 psi; PET at a substantially constant pressure of less than 5800 psi; Acetal copolymer at a substantially constant pressure of less than 7000 psi; plus poly(ethylene furanate) polyhydroxyalkanoate, polyethylene furanoate (aka PEF) at substantially constant pressure of less than 10000 psi, or 8000 psi, or 7000 psi or 6000 psi, or 5800 psi.

As described in detail above, embodiments of the disclosed low constant pressure injection molding method and device can achieve one or more advantages over conventional high variable pressure injection molding processes. For example, embodiments include a more cost effective and efficient process that eliminates the need to balance the pre-injection pressures of the mold cavity and the thermoplastic materials, a process that allows for use of atmospheric mold cavity pressures and, thus, simplified mold structures that eliminate the necessity of pressurizing means, the ability to use lower hardness, high thermal conductivity mold cavity materials that are more cost effective and easier to machine, a more robust processing method that is less sensitive to variations in the temperature, viscosity, and other material properties of the thermoplastic material, and the ability to produce quality injection molded parts at substantially constant pressures without premature hardening of the thermoplastic material in the mold cavity and without the need to heat or maintain constant temperatures in the mold cavity.

Figure 3:
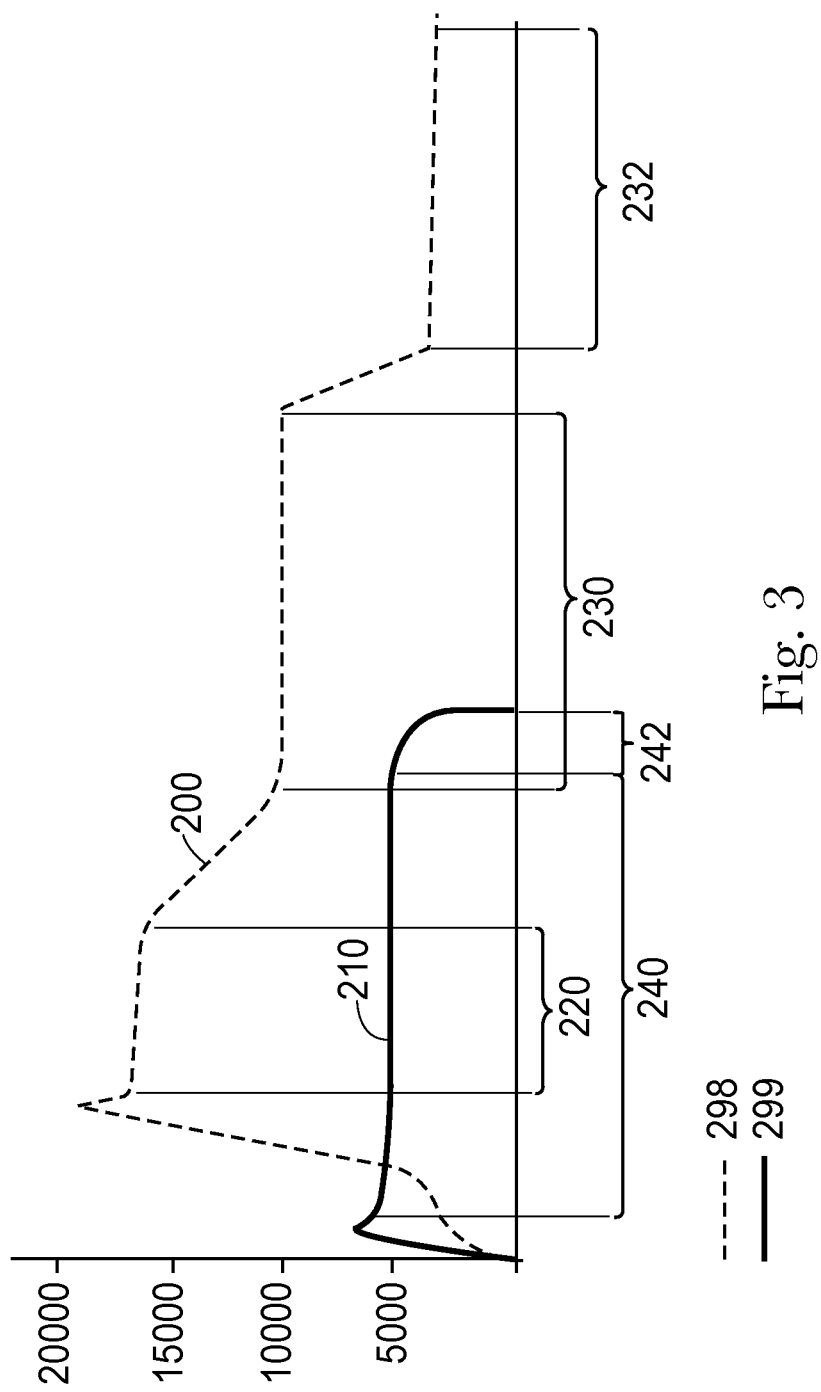
FIG. 3 is a cavity pressure vs. time graph for the low constant pressure injection molding machine of FIG. 1 superimposed over a cavity pressure vs. time graph for a conventional high variable pressure injection molding machine.

Turning now to FIG. 3, a typical pressure-time curve for a conventional high variable pressure injection molding process is illustrated by the dashed line 200. By contrast, a pressure-time curve for the disclosed low constant pressure injection molding machine is illustrated by the solid line 210.

In the conventional case, melt pressure is rapidly increased to well over 15,000 psi and then held at a relatively high pressure, more than 15,000 psi, for a first period of time 220. The first period of time 220 is the fill time in which molten plastic material flows into the mold cavity. Thereafter, the melt pressure is decreased and held at a lower, but still relatively high pressure, for a second period of time 230. The second period of time 230 is a packing time in which the melt pressure is maintained to ensure that all gaps in the mold cavity are back filled. After packing is complete, the pressure may optionally be dropped again for a third period of time 232, which is the cooling time. The mold cavity in a conventional high variable pressure injection molding system is packed from the end of the flow channel back to towards the gate. The material in the mold typically freezes off near the end of the cavity, then completely frozen off region of material progressively moves toward the gate location, or locations. As a result, the plastic near the end of the mold cavity is packed for a shorter time period and with reduced pressure, than the plastic material that is closer to the gate location, or locations. Part geometry, such as very thin cross sectional areas midway between the gate and end of mold cavity, can also influence the level of packing pressure in regions of the mold cavity. Inconsistent packing pressure may cause inconsistencies in the finished product, as discussed above. Moreover, the conventional packing of plastic in various stages of solidification results in some non-ideal material properties, for example, molded-in stresses, sink, and non-optimal optical properties.

The low constant pressure injection molding system, on the other hand, injects the molten plastic material into the mold cavity at a substantially constant pressure for a fill time period 240. The injection pressure in the example of FIG. 3 is less than 6,000 psi. However, other embodiments may use higher pressures. After the mold cavity is filled, the low constant pressure injection molding system gradually reduces pressure over a second time period 242 as the molded part is cooled. By using a substantially constant pressure, the molten thermoplastic material maintains a continuous melt flow front that advances through the flow channel from the gate towards the end of the flow channel. In other words, the molten thermoplastic material remains moving throughout the mold cavity, which prevents premature freeze off. Thus, the plastic material remains relatively uniform at any point along the flow channel, which results in a more uniform and consistent finished product. By filling the mold with a relatively uniform pressure, the finished molded parts form crystalline structures that may have better mechanical and optical properties than conventionally molded parts. Moreover, the parts molded at constant pressures exhibit different characteristics than skin layers of conventionally molded parts. As a result, parts molded under constant pressure may have better optical properties than parts of conventionally molded parts.

Figure 4:
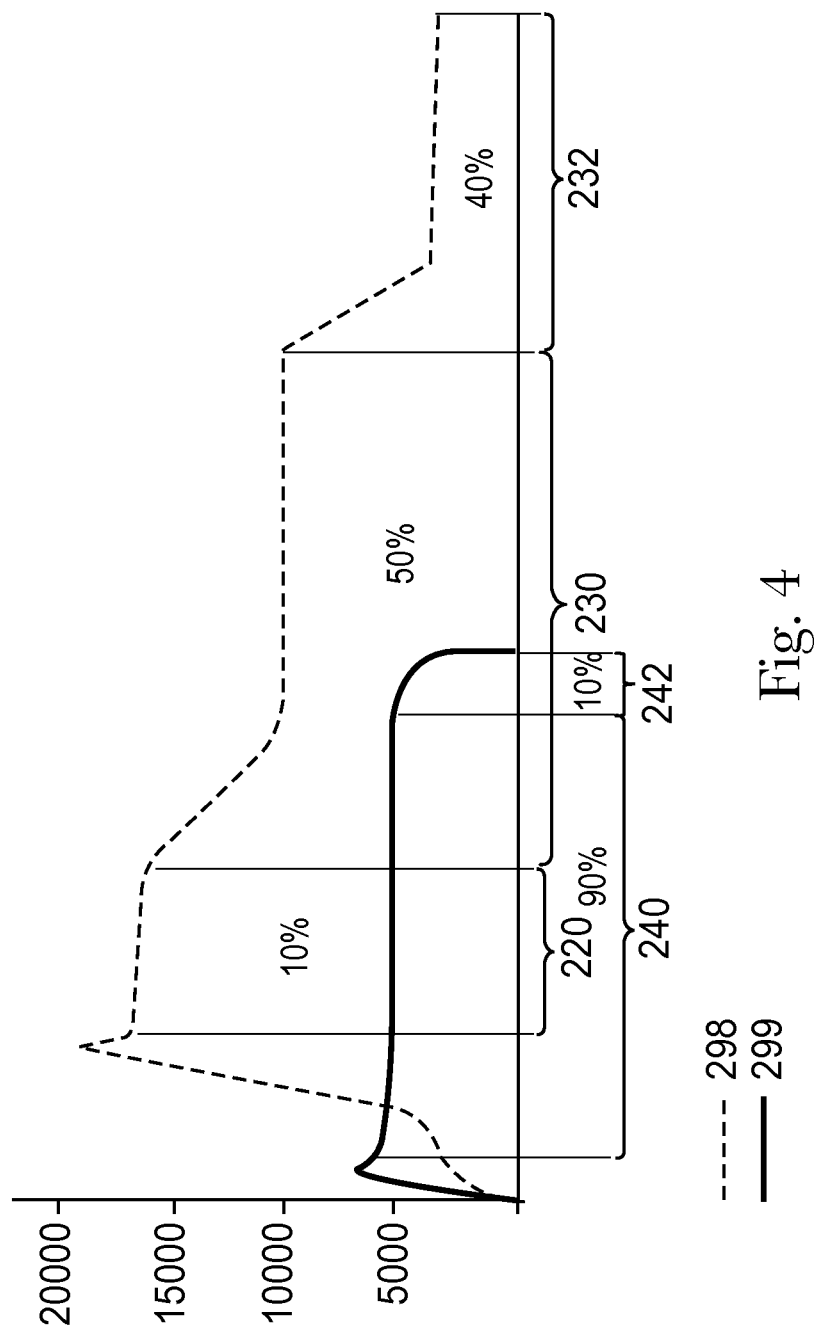
FIG. 4 is another cavity pressure vs. time graph for the low constant pressure injection molding machine of FIG. 1 superimposed over a cavity pressure vs. time graph for a conventional high variable pressure injection molding machine, the graphs illustrating the percentage of fill time devoted to certain fill steps.

Turning now to FIG. 4, the various stages of fill are broken down as percentages of overall fill time. For example, in an conventional high variable pressure injection molding process, the fill period 220 makes up about 10% of the total fill time, the packing period 230 makes up about 50% of the total fill time, and the cooing period 232 makes up about 40% of the total fill time. On the other hand, in the low constant pressure injection molding process, the fill period 240 makes up about 90% of the total fill time while the cooling period 242 makes up only about 10% of the total fill time. The low constant pressure injection molding process needs less cooling time because the molten plastic material is cooling as it is flowing into the mold cavity. Thus, by the time the mold cavity is filled, the molten plastic material has cooled significantly, although not quite enough to freeze off in the center cross section of the mold cavity, and there is less total heat to remove to complete the freezing process. Additionally, because the molten plastic material remains liquid throughout the fill, and packing pressure is transferred through this molten center cross section, the molten plastic material remains in contact with the mold cavity walls (as opposed to freezing off and shrinking away). As a result, the low constant pressure injection molding process described herein is capable of filling and cooling a molded part in less total time than in a conventional high variable pressure injection molding process.

In the disclosed low constant pressure injection molding method and device for molding a high L/T part, the part is molded by injecting a molten thermoplastic polymer into a mold cavity at an increasing flow rate to achieve a desired injection pressure and then decreasing the flow rate over time to maintain a substantially constant injection pressure. The low constant pressure injection molding method and device are particularly advantageous when molding thinwall parts (e.g., parts having an L/T ratio>100<1000) and when using shot sizes of between 0.1 g and 100 g. It is especially advantageous that the maximum flow rate occur within the first 30% of cavity fill, preferably within the first 20% of cavity fill, and even more preferably within the first 10% of cavity fill. By adjusting the filling pressure profile the maximum flow rate occurs within these preferred ranges of cavity fill, the molded part will have at least some of the physical advantages described above (e.g., better strength, better optical properties, etc.) because the crystalline structure of the molded part is different from a conventionally molded part. Moreover, because high L/T products are thinner, these products require less pigment to impart a desired color to the resulting product. Furthermore, in no-pigment parts, the parts will have less visible deformities due to the more consistent molding conditions. Using less or no pigment saves costs.

Alternatively, the peak power may be adjusted to maintain a substantially constant injection pressure. More specifically, the filling pressure profile may be adjusted to cause the peak power to occur in the first 30% of the cavity fill, preferably in the first 20% of the cavity fill, and even more preferably in the first 10% of the cavity fill. Adjusting the process to cause the peak power to occur within the preferred ranges, and then to have a decreasing power throughout the remainder of the cavity fill results in the same benefits for the molded part that were described above with respect to adjusting peak flow rate. Moreover, adjusting the process in the manner described above is particularly advantageous for thinwall parts (e.g., L/T ratio>100<1000) and for shot sizes of between 0.1 g and 100 g).

Turning now to FIGS. 5A-5D and FIGS. 6A-6D a portion of a mold cavity as it is being filled by a conventional high variable pressure injection molding machine (FIGS. 5A-5D) and as it is being filled by a substantially constant pressure injection molding machine (FIGS. 6A-6D) is illustrated.

Figure 5A:
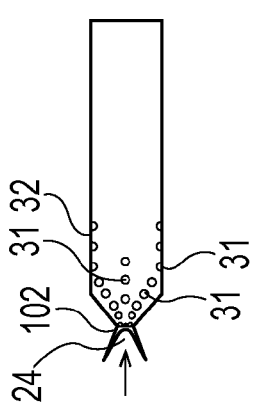
FIGS. 5A-5D are side cross-sectional views of a portion of a thinwall mold cavity in various stages of fill by a conventional high variable pressure injection molding machine.
Figure 5B:
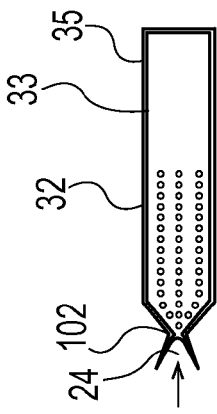
Figure 5C:
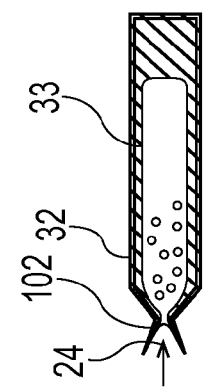
Figure 5D:
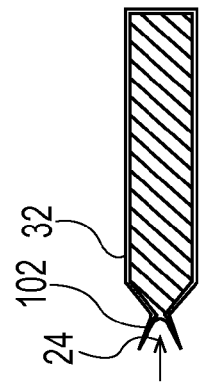
Figure 6A:
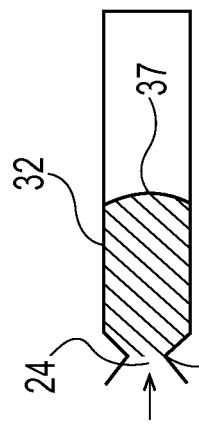
FIGS. 6A-6D are side cross-sectional views of a portion of a thinwall mold cavity in various stages of fill by the low constant pressure injection molding machine of FIG. 1.
Figure 6B:
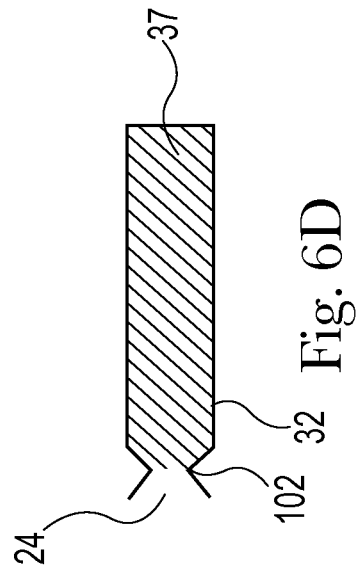
Figure 6C:
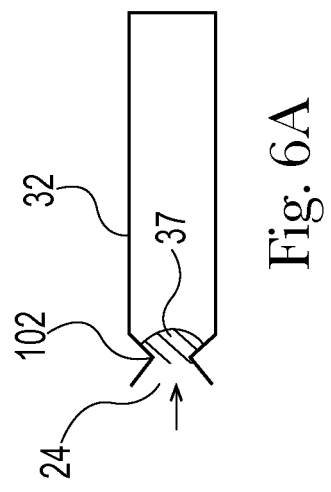
Figure 6D:
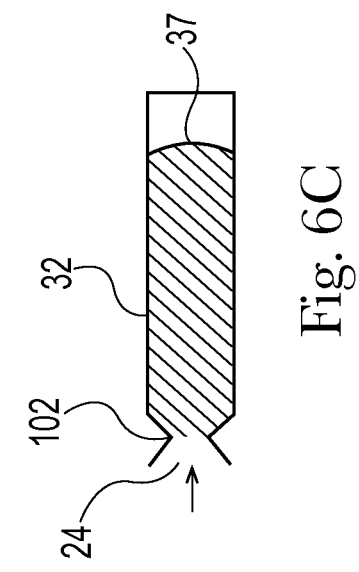

As illustrated in FIGS. 5A-5D, as the conventional high variable pressure injection molding machine begins to inject molten thermoplastic material 24 into a mold cavity 32 through the gate 30, the high injection pressure tends to inject the molten thermoplastic material 24 into the mold cavity 32 at a high rate of speed, which causes the molten thermoplastic material 24 to flow in laminates 31, most commonly referred to as laminar flow (FIG. 5A). These outermost laminates 31 adhere to walls of the mold cavity and subsequently cool and freeze, forming a frozen boundary layer 33 (FIG. 5B), before the mold cavity 32 is completely full. As the thermoplastic material freezes, however, it also shrinks away from the wall of the mold cavity 32, leaving a gap 35 between the mold cavity wall and the boundary layer 33. This gap 35 reduces cooling efficiency of the mold. Molten thermoplastic material 24 also begins to cool and freeze in the vicinity of the gate 30, which reduces the effective cross-sectional area of the gate 30. In order to maintain a constant volumetric flow rate, the conventional high variable pressure injection molding machine must increase pressure to force molten thermoplastic material through the narrowing gate 30. As the thermoplastic material 24 continues to flow into the mold cavity 32, the boundary layer 33 grows thicker (FIG. 5C). Eventually, the entire mold cavity 32 is substantially filled by thermoplastic material that is frozen (FIG. 5D). At this point, the conventional high pressure injection molding machine must maintain a packing pressure to push the receded boundary layer 33 back against the mold cavity 32 walls to increase cooling.

A low constant pressure injection molding machine, on the other hand, flows molten thermoplastic material into a mold cavity 32 with a constantly moving flow front 37 (FIGS. 6A-6D). The thermoplastic material 24 behind the flow front 37 remains molten until the mold cavity 37 is substantially filled (i.e., 99% or more filled) before freezing. As a result, there is no reduction in effective cross-sectional area of the gate 30, which may be between 70% and 100%, preferably between 80% and 90%, of the nominal wall thickness of the molded part. Moreover, because the thermoplastic material 24 is molten behind the flow front 37, the thermoplastic material 24 remains in contact with the walls of the mold cavity 32. As a result, the thermoplastic material 24 is cooling (without freezing) during the fill portion of the molding process. Thus, the cooling portion of the disclosed low constant pressure injection molding process need not be as long as a conventional process.

Because the thermoplastic material remains molten and keeps moving into the mold cavity 32, less injection pressure is required than in conventional molds. In one embodiment, the injection pressure may be 6,000 psi or less. As a result, the injection systems and clamping systems need not be as powerful. For example, the disclosed low constant pressure injection molding devices may use clamps requiring lower clamping forces, and a corresponding lower clamping power source. Moreover, the disclosed low constant pressure injection molding machines, because of the lower power requirements, may employ electric presses, which are generally not powerful enough to use in conventional class 101 and 102 injection molding machines that mold thinwall parts at high variable pressures. Even when electric presses are sufficient to use for some simple, molds with few mold cavities, the process may be improved with the disclosed low constant pressure injection molding methods and devices as smaller, less expensive electric motors may be used. The disclosed low constant pressure injection molding machines may comprise one or more of the following types of electric presses, a direct servo drive motor press, a dual motor belt driven press, a dual motor planetary gear press, and a dual motor ball drive press having a power rating of 200 HP or less.

Figure 7:
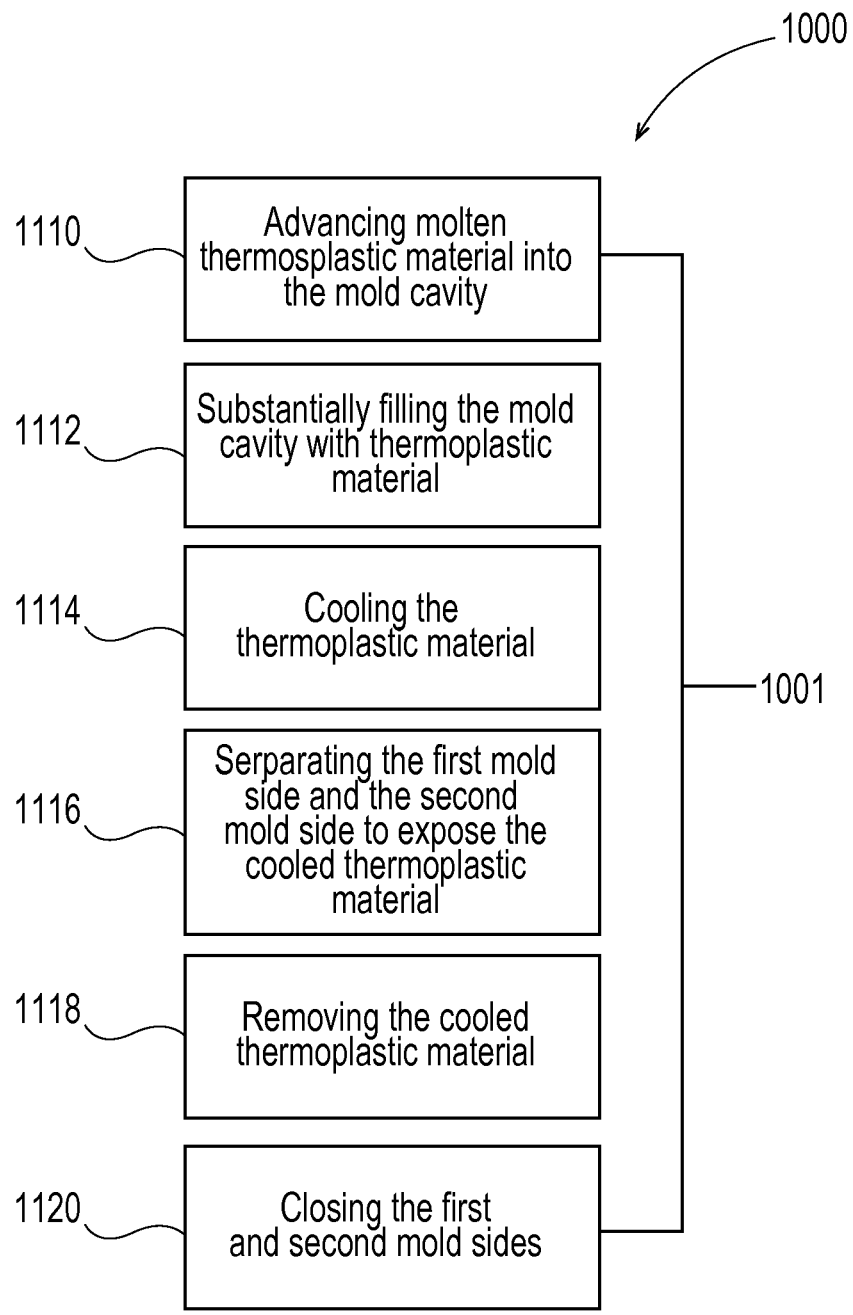
FIG. 7 is a schematic illustration of an injection molding cycle that may be carried out on a low constant pressure injection molding machine.
Figure 8:
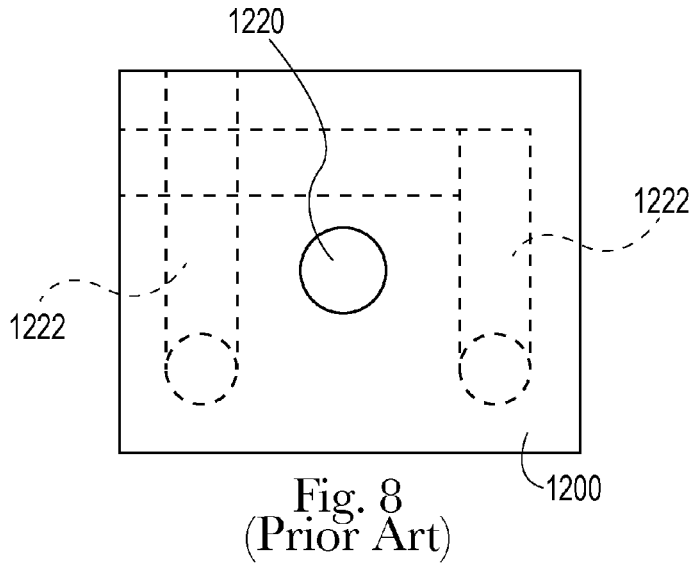
FIG. 8 is a front view of a portion of a high hardness, low thermal conductivity mold insert having a single cavity for a conventional multi-cavity mold, with cooling channels illustrated in broken lines.
Figure 9:
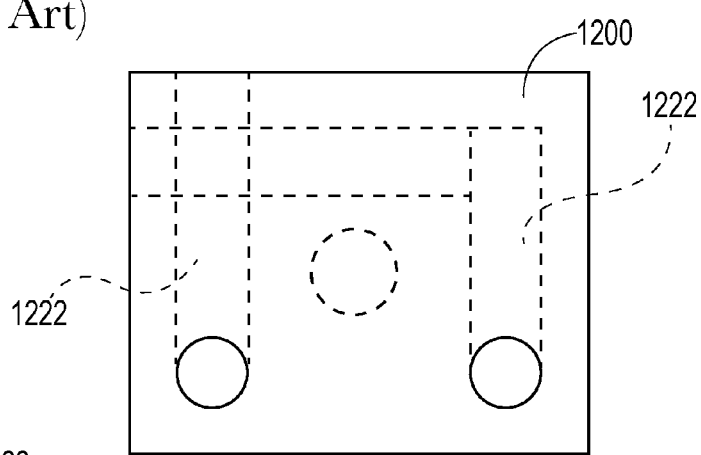
FIG. 9 is a rear view of the portion of the high hardness, low thermal conductivity mold insert illustrated in FIG. 8.
Figure 10:
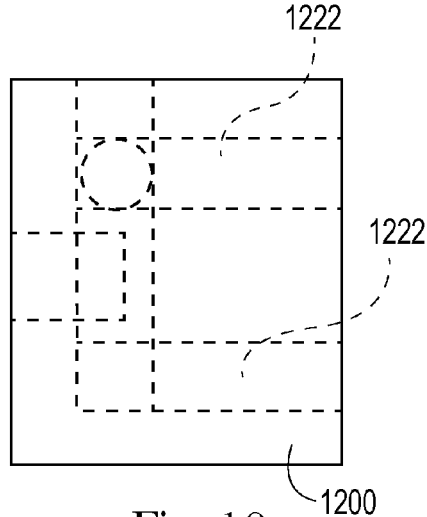
FIG. 10 is a right side plan view of the portion of the high hardness, low thermal conductivity mold insert illustrated in FIG. 8.

Turning now to FIG. 7, operation of an example molding cycle 1000 for the low constant pressure injection molding process is illustrated. The molding cycle 1000 may be carried out on a low constant pressure injection molding machine constructed in accordance with the disclosure, for example, on the low constant pressure injection molding machine of FIG. 1. More specifically, the example molding cycle 1000 may be carried out on a low constant pressure injection molding machine having a mold including a first mold side and a second mold side, at least one of the first mold side and the second mold side having an average thermal conductivity of more than 51.9 W/m-° C. (30 BTU/HR FT ° F.) and less than or equal to 385.79 W/m-° C. (223 BTU/HR FT ° F.) (or any integer value for W/m-° C., in this range, or any range formed by any such integer values), and a mold cavity that is formed between the first mold side and the second mold side. In some preferred embodiments, both the first and second mold side may have an average thermal conductivity of more than 51.9 W/m-° C. (30 BTU/HR FT ° F.) and less than or equal to 385.79 W/m-° C. (223 BTU/HR FT ° F.) (or any integer value for W/m-° C., in this range, or any range formed by any such integer values).

Some preferred materials for manufacturing the first and/or second mold sides include aluminum (for example, 2024 aluminum, 2090 aluminum, 2124 aluminum, 2195 aluminum, 2219 aluminum, 2324 aluminum, 2618 aluminum, 5052 aluminum, 5059 aluminum, aircraft grade aluminum, 6000 series aluminum, 6013 aluminum, 6056 aluminum, 6061 aluminum, 6063 aluminum, 7000 series aluminum, 7050 aluminum, 7055 aluminum, 7068 aluminum, 7075 aluminum, 7076 aluminum, 7150 aluminum, 7475 aluminum, QC-10, Alumold™, Hokotol™, Duramold 2™, Duramold 5™, and Alumec 99™), BeCu (for example, C17200, C 18000, C61900, C62500, C64700, C82500, Moldmax LH™, Moldmax HH™, and Protherm™), Copper, and any alloys of aluminum (e.g., Beryllium, Bismuth, Chromium, Copper, Gallium, Iron, Lead, Magnesium, Manganese, Silicon, Titanium, Vanadium, Zinc, Zirconium), any alloys of copper (e.g., Magnesium, Zinc, Nickel, Silicon, Chromium, Aluminum, Bronze). These materials may have Rockwell C (Rc) hardnesses of between 0.5 Rc and 20 Rc, preferably between 2 Rc and 20 Rc, more preferably between 3 Rc and 15 Rc, and more preferably between 4Rc and 10 Rc. While these materials may be softer than tool steels, the thermal conductivity properties are more desirable. The disclosed low constant pressure injection molding methods and devices advantageously operate under molding conditions that allow molds made of these softer, higher thermal conductivity, materials to extract useful lives of more than 1 million cycles, preferably between 1.25 million cycles and 10 million cycles, and more preferably between 2 million cycles and 5 million cycles.

Initially, molten thermoplastic material is advanced into a mold cavity that defines a thin-walled part (e.g., 100<L/T<1000) at 1110. A shot of molten thermoplastic material may be between 0.5 g and 100 g and may be advanced through three or fewer gates into the mold cavity. In some cases one or more of the three of fewer gates may have a cross-sectional area that is between 70% and 100% of a nominal wall thickness of a part that is formed in the mold cavity, and preferably between 80% and 90% of the nominal wall thickness. In some examples, this percentage may correspond to a gate size of between 0.5 mm and 10 mm.

Molten thermoplastic material is advanced into the mold cavity until the mold cavity is substantially filled at 1112. The mold cavity may be substantially filled when the mold cavity is more than 90% filled, preferably more than 95% filled and more preferably more than 99% filled. After the mold cavity is substantially filled, the molten thermoplastic material is cooled at 1114 until the molten thermoplastic material is substantially frozen or solidified. The molten thermoplastic material may be actively cooled with a cooling liquid flowing through at least one of the first and second mold sides, or passively cooled through convection and conduction to the atmosphere.

After the thermoplastic material is cooled, the first and second mold sides may be separated to expose the cooled thermoplastic material at 1116. The cooled thermoplastic material (in the form of the molded part) may be removed from the mold at 1118. The thermoplastic material may be removed by, for example, ejection, dumping, extraction (manually or via an automated process), pulling, pushing, gravity, or any other method of separating the cooled thermoplastic material from the first and second mold sides.

After the cooled thermoplastic material is removed from the first and second mold sides, the first and second mold sides may be closed, reforming the mold cavity, at 1120, which prepares the first and second mold sides to receive a new shot of molten thermoplastic material, thereby completing a single mold cycle. Cycle time 1001 is defined as a single iteration of the molding cycle 1000. A single molding cycle may take between 2 seconds and 15 seconds, preferably between 8 seconds and 10 seconds, depending on the part size and material.

Variable Position Mold Systems with Low, Substantially Constant Pressure

Turning to FIGS. 8-10 and 14, a conventional multi-cavity mold 1200 is made of a high hardness, low thermal conductivity metal, such as tool steel, to withstand the high pressures and clamp tonnage commonly accepted in the injection molding industry as necessary to achieve adequate molding results while avoiding such drawbacks as premature freezing off. Variable position mold systems are advantageous for manufacture of products having complex geometry or composition, in particular products requiring multiple shots or other processing beyond a single injection mold shot cycle. An example of a variable position mold system is a rotatable cube mold 1210 having a plurality of product-specific mold inserts 1212, 1214, 1216, 1218 each with a plurality of mold cavities 1220. In conventional a cube mold 1210, the mass of the high hardness, low thermal conductivity metal translates into a high moment of inertia, requiring significant design considerations regarding rotation of such cube mold 1210 from one position to the next to permit successive molding operations to be performed. A heavy cube mold 1210 requires powerful actuators to initiate rotation, cause acceleration to perform a sufficiently-rapid rotation, cause deceleration, and ultimately stop rotation in a manner such that the cube mold's momentum does not carry the mold cavities past the next position. Mold operation choreography must factor in time for the heavy cube mold to come to a complete rest to ensure proper alignment of mold cavities 1220 in the various product-specific mold inserts 1212, 1214, 1216, 1218 on the faces of the cube mold 1210.

Figure 24:
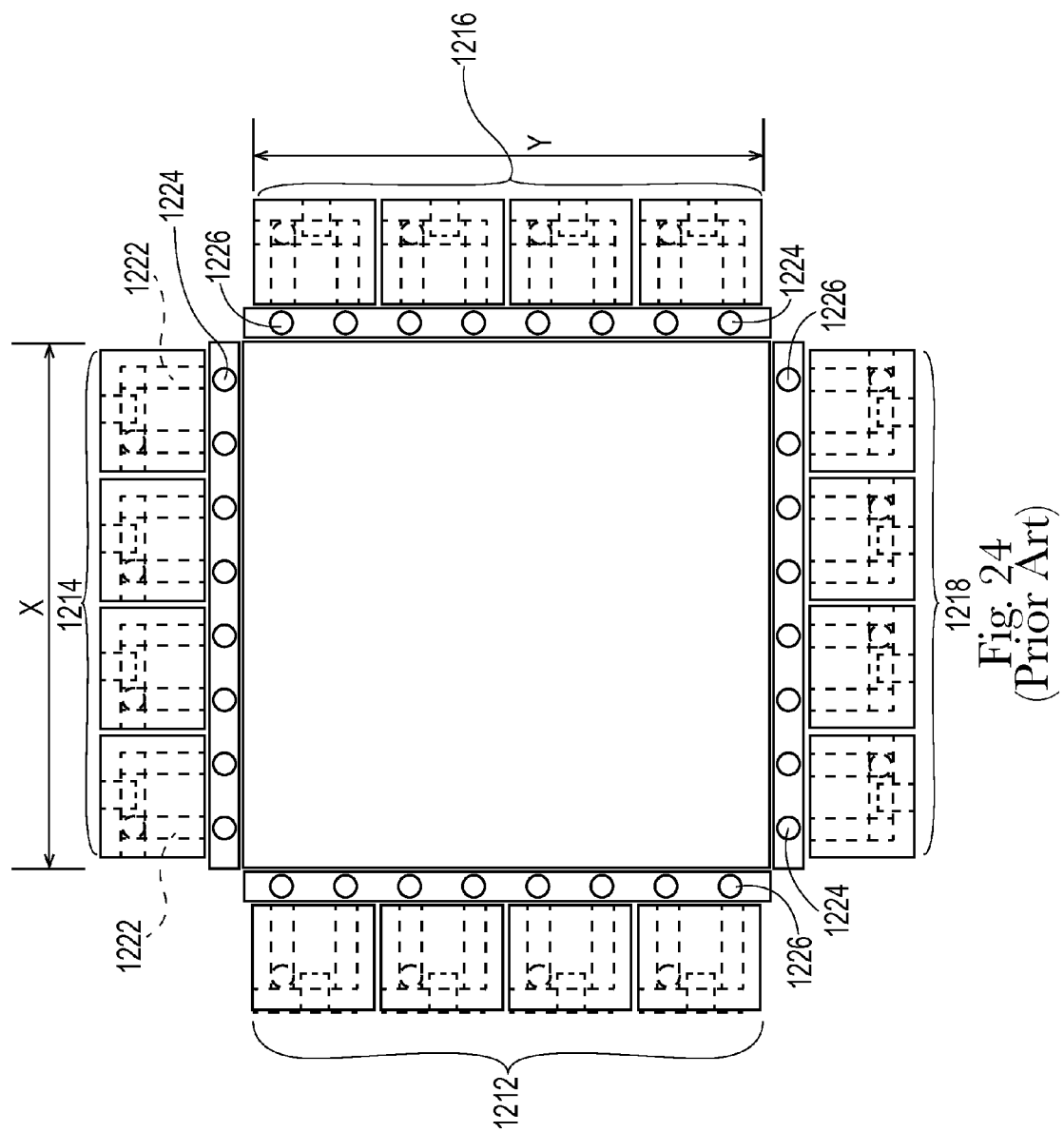
FIG. 24 is a top view similar to FIG. 17 of the conventional high hardness, low thermal conductivity mold illustrated in FIG. 14, each face of which includes a four-by-four array of mold cavities, with cooling channels associated with each of the mold cavities illustrated in broken lines, as well as inlet and outlet cooling fluid lines provided in plates to which product-specific multi-cavity mold inserts are secured.

Due to the low thermal conductivity of the mold 1200 or the product-specific mold inserts 1212, 1214, 1216, 1218, a network of cooling channels 1222 is necessary to draw heat away from the mold cavities after each injection molding shot. The plumbing for these cooling channels 1222 or lines, and the fluid carried therein, add significant weight, cost, and complexity to the manufacture and operation of the cube mold 1210. As illustrated in FIG. 24, not only are cooling channels 1222 provided in the product-specific mold inserts 1212, 1214, 1216, 1218, but inlet and outlet lines 1224, 1226 in fluid communication with those cooling channels 1222 are provided in plates 1228, 1230, 1232, 1234 to which the product-specific mold inserts 1212, 1214, 1216, 1218 are mounted. These conventional cooling systems require seals in the movable center (spinning or rotatable) section of the cube mold in a manner that permits rotation of the cube mold between positions without leakage of cooling fluid. Also, when the product-specific mold inserts 1212, 1214, 1216, 1218 are changed, it must be assured that none of the interfaces between the cooling channels 1222 and the inlet and outlet lines 1224, 1226 leak.

While exotic cooling fluids, such as mercury, offer superior performance to water in terms of boiling point and capacity to efficiently transfer heat from the vicinity of a molding surface, concerns over the sealing of cooling channels 1222 provided within multi-cavity high hardness, low thermal conductivity product-specific mold inserts 1212, 1214, 1216, 1218 has prevented commercial acceptance or use of such exotic cooling fluids. This concern is particularly acute in the case of multi-faced mold systems, such as cube molds, where the movable central section 1236 requires dynamic seals to permit rotation of the cube mold 1210, which dynamic seals have a greater propensity to leak, as compared to static molds. Furthermore, the rotation of the cube results in transverse forces on the product-specific mold inserts 1212, 1214, 1216, 1218 that can result in transverse movement of the mold inserts, and cause seals connecting the mold components to the cooling fluid lines or inlet/outlet lines 1224, 1226 contained in the support plates to leak.

Evaporative cooling systems may use many different types of cooling fluids, such as refrigerants (e.g., chlorofluorocarbons, chlorofluoroolefins, hydrochlorofluorocarbons, hydrochlorofluoroolefins, hydrofluorocarbons, hydrofluoroolefins, hydrochlorocarbons, hydrochloroolefins, hydrocarbons, hydroolefins, perfluorocarbons, perfluoroolefins, perchlorocarbons, perchloroolefins, and halon/haloalkane, and blends thereof), water, glycol, propylene glycol, alcohol, or mercury. Other refrigerants having cooling capacities and/or physical or chemical properties similar to the refrigerants listed above may also be used. Similarly, other cooling fluids that undergo a phase change when exposed to temperatures between about 0° C. and about 200° C. at pressures between 0 psi (i.e., complete vacuum) and about 2000 psi, may also be used. In some cases a surfactant may be added to the cooling fluid. Some evaporative cooling systems may utilize a vacuum system to create differential pressure, while other evaporative cooling systems may utilize compressors to create differential pressure.

Figure 11:
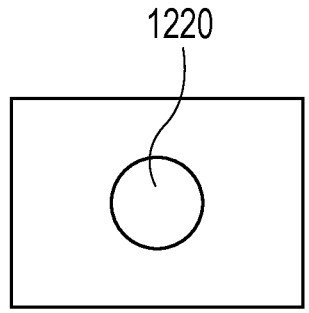
FIG. 11 is a front view of a portion of a low hardness, high thermal conductivity mold insert having a single cavity for a conventional multi-cavity mold of the present disclosure, which mold insert is free of cooling channels.
Figure 12:
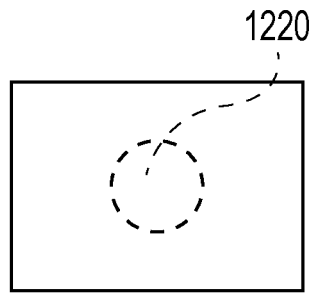
FIG. 12 is a rear view of the portion of a low hardness, high thermal conductivity mold illustrated in FIG. 11.
Figure 13:
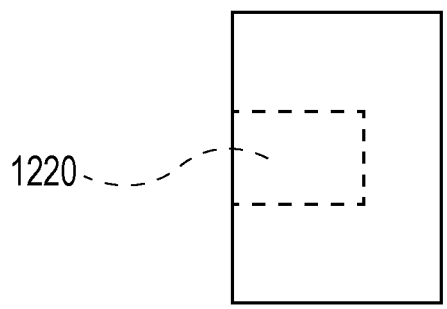
FIG. 13 is a right side view of the portion of a low hardness, high thermal conductivity mold illustrated in FIG. 12.
Figure 14:
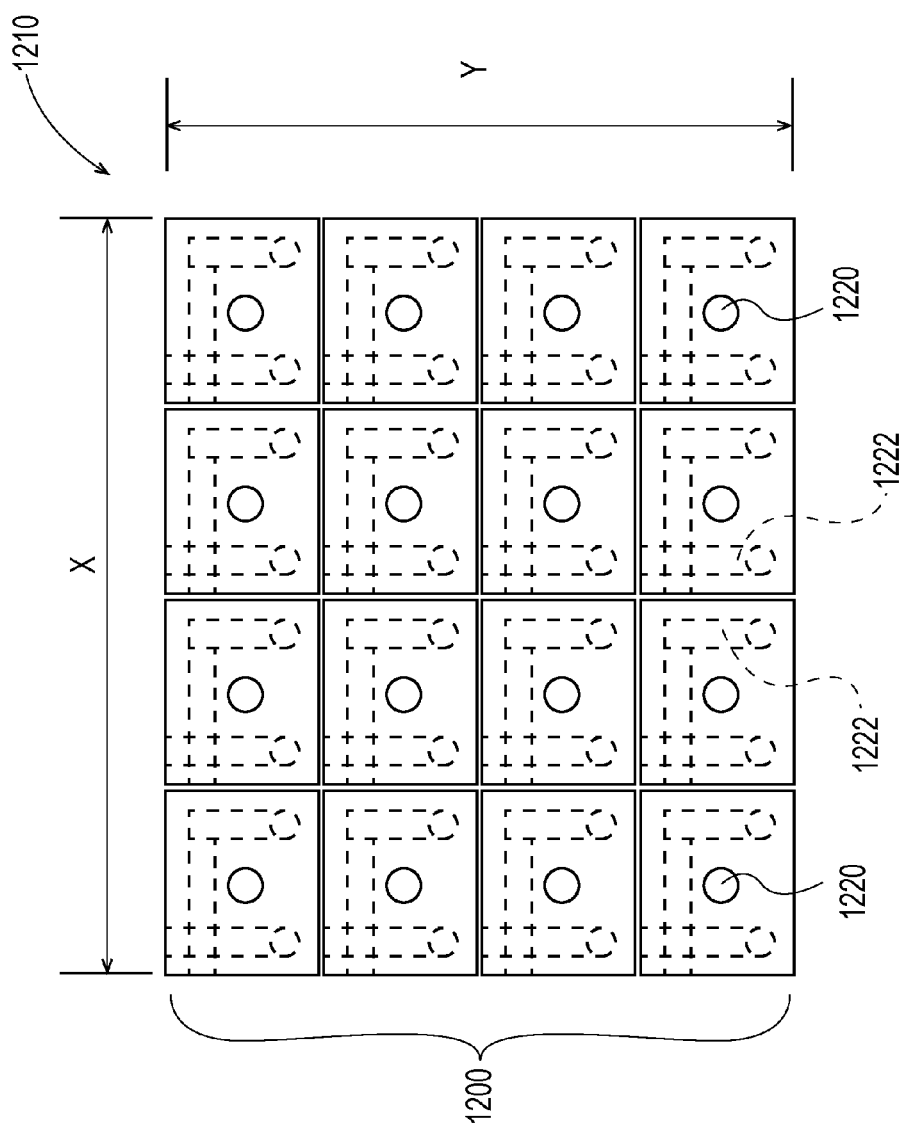
FIG. 14 is a front plan view of a face of a conventional high hardness, low thermal conductivity mold including a four-by-four array of mold cavities, with cooling channels associated with each of the mold cavities illustrated in broken lines.
Figure 15:
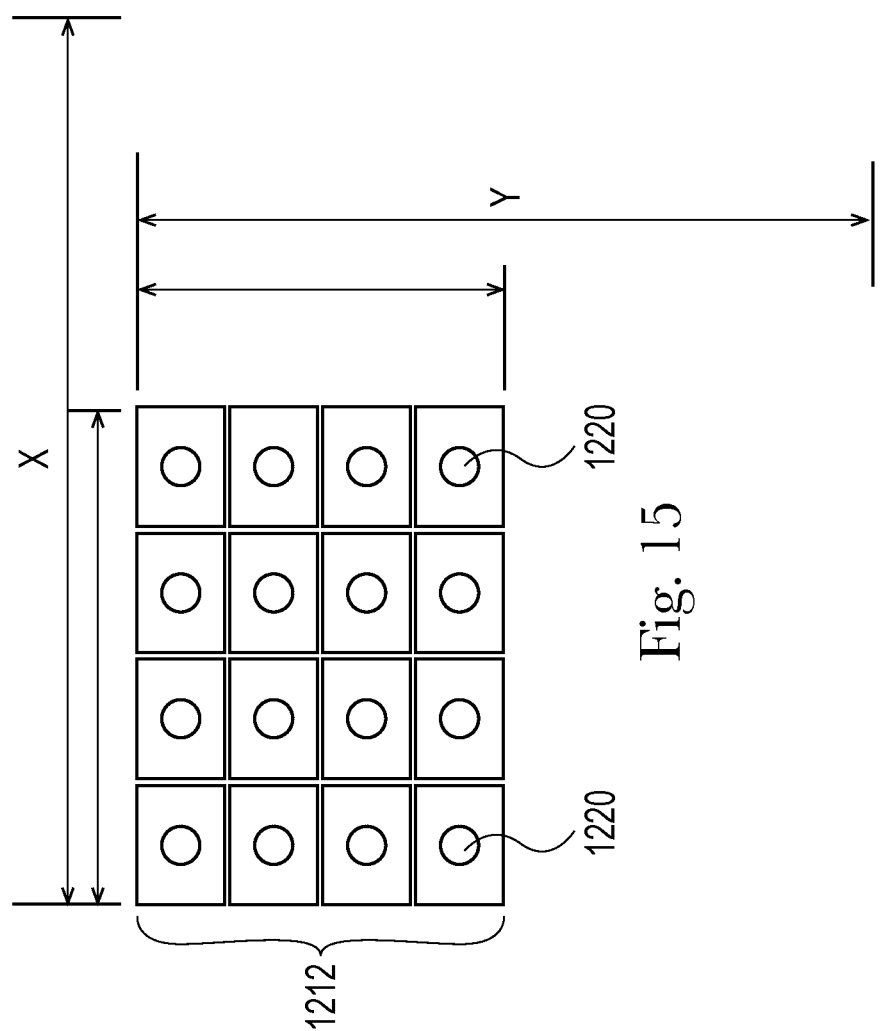
FIG. 15 is a front plan view of a face of a low hardness, high thermal conductivity mold of an embodiment of the present disclosure including a four-by-four array of mold cavities each having dimensions (such as diameter and depth) the same as respective dimensions of the mold cavities of the conventional multi-cavity mold illustrated in FIG. 14, the mold of FIG. 15 being free of cooling channels, permitting the mold cavities to be disposed in closer proximity to one another than the mold cavities of the conventional multi-cavity mold illustrated in FIG. 14, with the overall length and height dimensions of the mold of FIG. 15 being less than overall length and height dimensions of the mold of FIG. 14.
Figure 16:
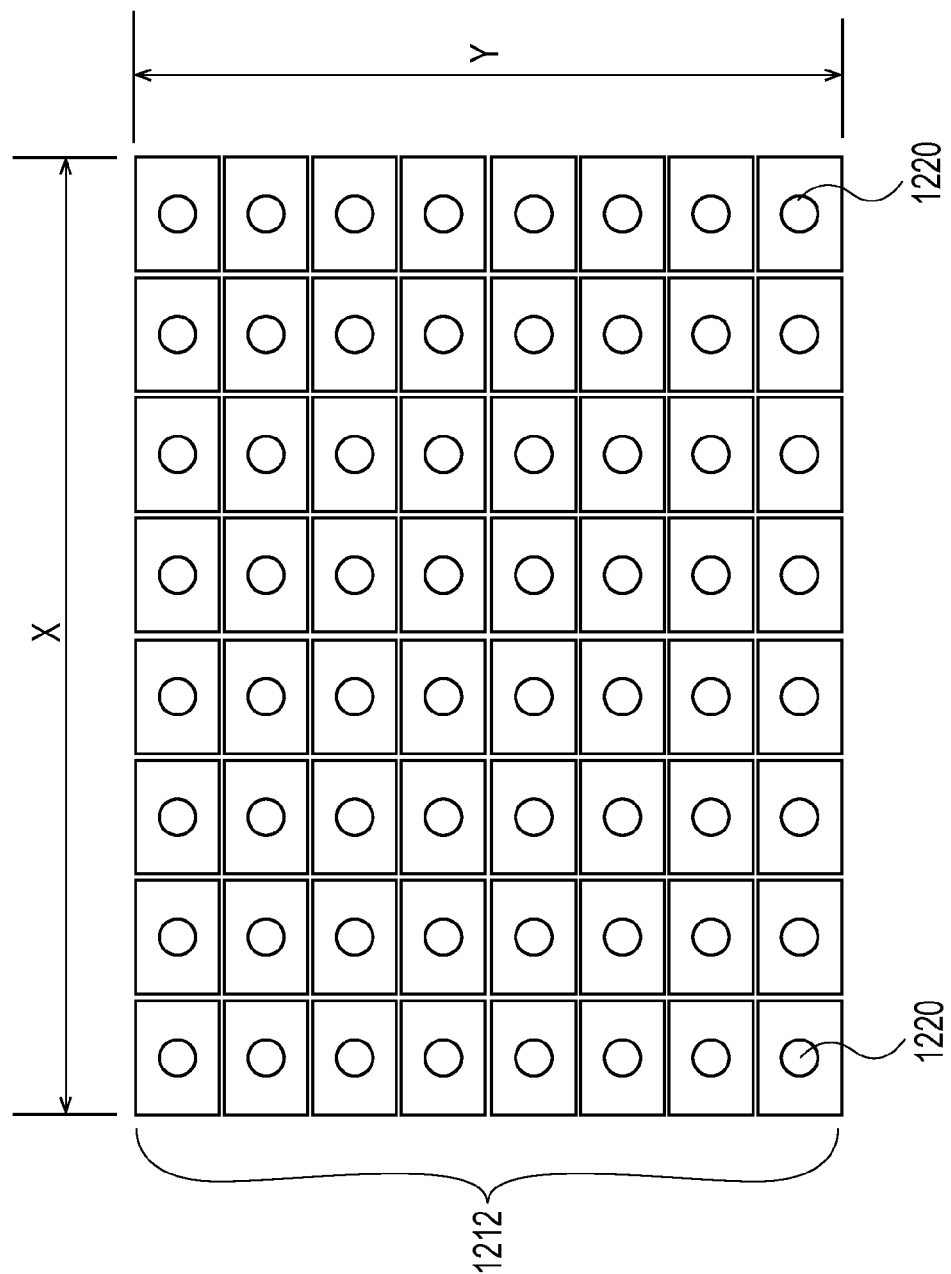
FIG. 16 is a front plan view of a face of a low hardness, high thermal conductivity mold of an alternate embodiment of the present disclosure including an eight-by-eight array of mold cavities each having dimensions (such as diameter and depth) the same as respective dimensions of the mold cavities of the conventional multi-cavity mold illustrated in FIG. 14, the mold of FIG. 16 being free of cooling channels, permitting the mold cavities to be disposed in closer proximity to one another than the mold cavities of the conventional multi-cavity mold illustrated in FIG. 14 and permitting a greater total number of mold cavities in a mold having the same length and height dimensions as the conventional multi-cavity mold illustrated in FIG. 14.
Figure 17:
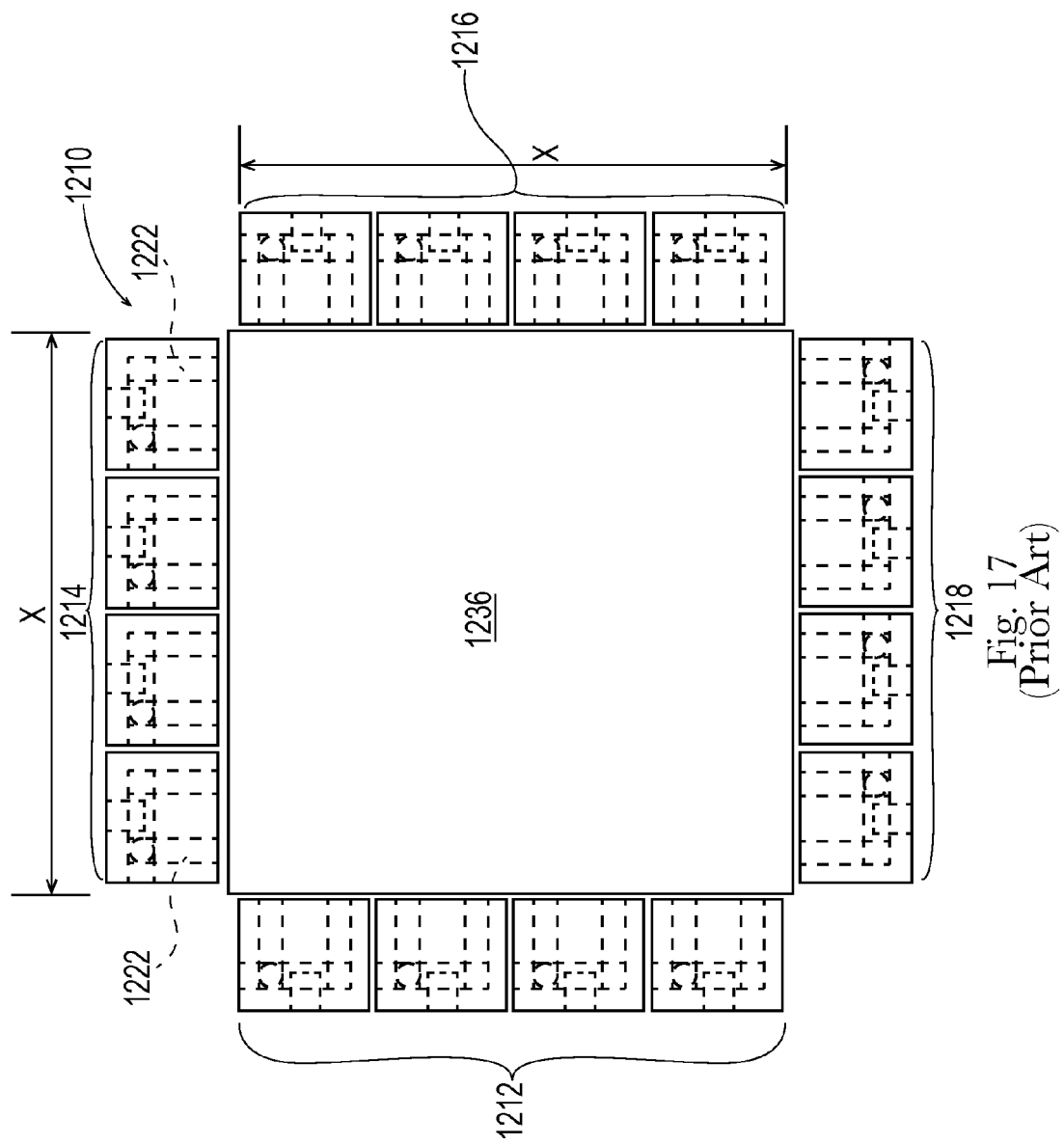
FIG. 17 is a top view of the conventional high hardness, low thermal conductivity mold illustrated in FIG. 14, each face of which includes a four-by-four array of mold cavities, with cooling channels associated with each of the mold cavities illustrated in broken lines.
Figure 18:
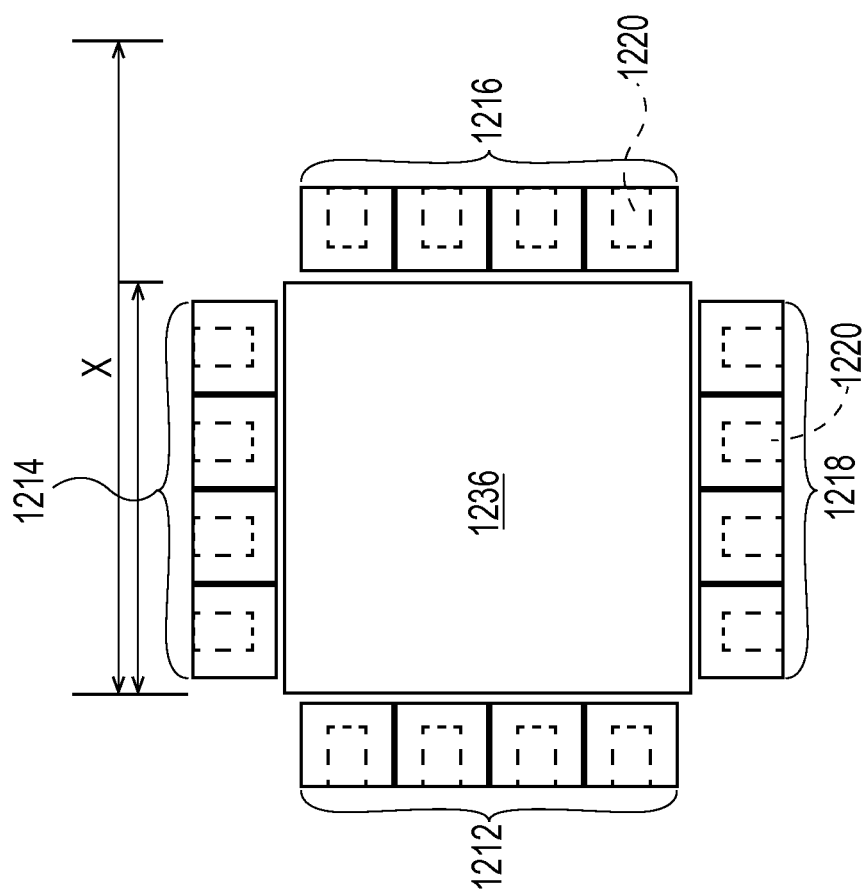
FIG. 18 is a top view of the low hardness, high thermal conductivity mold illustrated in FIG. 15.

Because the need for high hardness, low thermal conductivity steels in multi-cavity product-specific mold inserts 1212, 1214, 1216, 1218 is premised upon the notion that injection cycles must take place under high pressure, the low constant pressure injection molding system and method of the present disclosure offers particular benefits to variable position molding systems. By injecting at low substantially constant pressure, the product-specific mold inserts 1212, 1214, 1216, 1218 may be manufactured of a lower hardness, higher thermal conductivity material, such as aluminum (for example, 2024 aluminum, 2090 aluminum, 2124 aluminum, 2195 aluminum, 2219 aluminum, 2324 aluminum, 2618 aluminum, 5052 aluminum, 5059 aluminum, aircraft grade aluminum, 6000 series aluminum, 6013 aluminum, 6056 aluminum, 6061 aluminum, 6063 aluminum, 7000 series aluminum, 7050 aluminum, 7055 aluminum, 7068 aluminum, 7075 aluminum, 7076 aluminum, 7150 aluminum, 7475 aluminum, QC-10, Alumold™, Hokotol™, Duramold 2™, Duramold 5™, and Alumec 99™), BeCu (for example, C17200, C 18000, C61900, C62500, C64700, C82500, Moldmax LH™, Moldmax HH™, and Protherm™), Copper, and any alloys of aluminum (e.g., Beryllium, Bismuth, Chromium, Copper, Gallium, Iron, Lead, Magnesium, Manganese, Silicon, Titanium, Vanadium, Zinc, Zirconium), any alloys of copper (e.g., Magnesium, Zinc, Nickel, Silicon, Chromium, Aluminum, Bronze). These materials may have Rockwell C (Rc) hardnesses of between 0.5 Rc and 20 Rc, preferably between 2 Rc and 20 Rc, more preferably between 3 Rc and 15 Rc, and more preferably between 4Rc and 10 Rc. Due to the relatively high thermal conductivity of these materials, as illustrated in FIGS. 11-13, a mold 1250 may be made with a mold cavity 1270 having the same dimensions (such as diameter and depth) as the mold cavity 1220 of a conventional multi-cavity mold 1200, but without the need for cooling channels or cooling lines, since the metallurgy of the mold permits sufficiently fast dissipation of heat from the molding surfaces. Even if cooling channels of the mold 1250 are not completely eliminated, they can by greatly simplified as compared to the complexity of conventional cooling channels 1222, which often had to follow the geometry of mold cavities as much as possible, and/or be located as close to the molding surface as possible.

Figure 19:
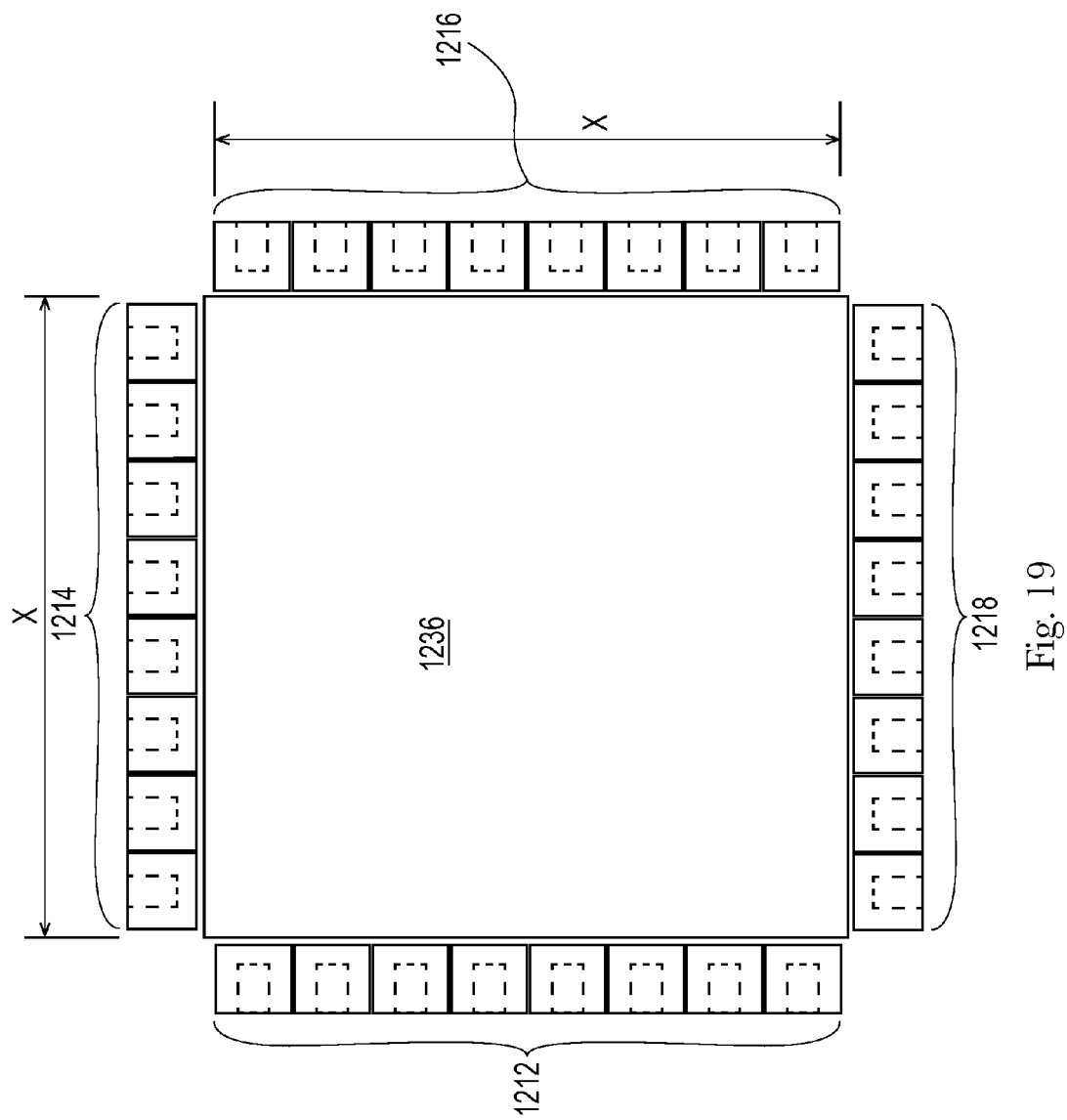
FIG. 19 is a top view of the low hardness, high thermal conductivity mold illustrated in FIG. 16.
Figure 25:
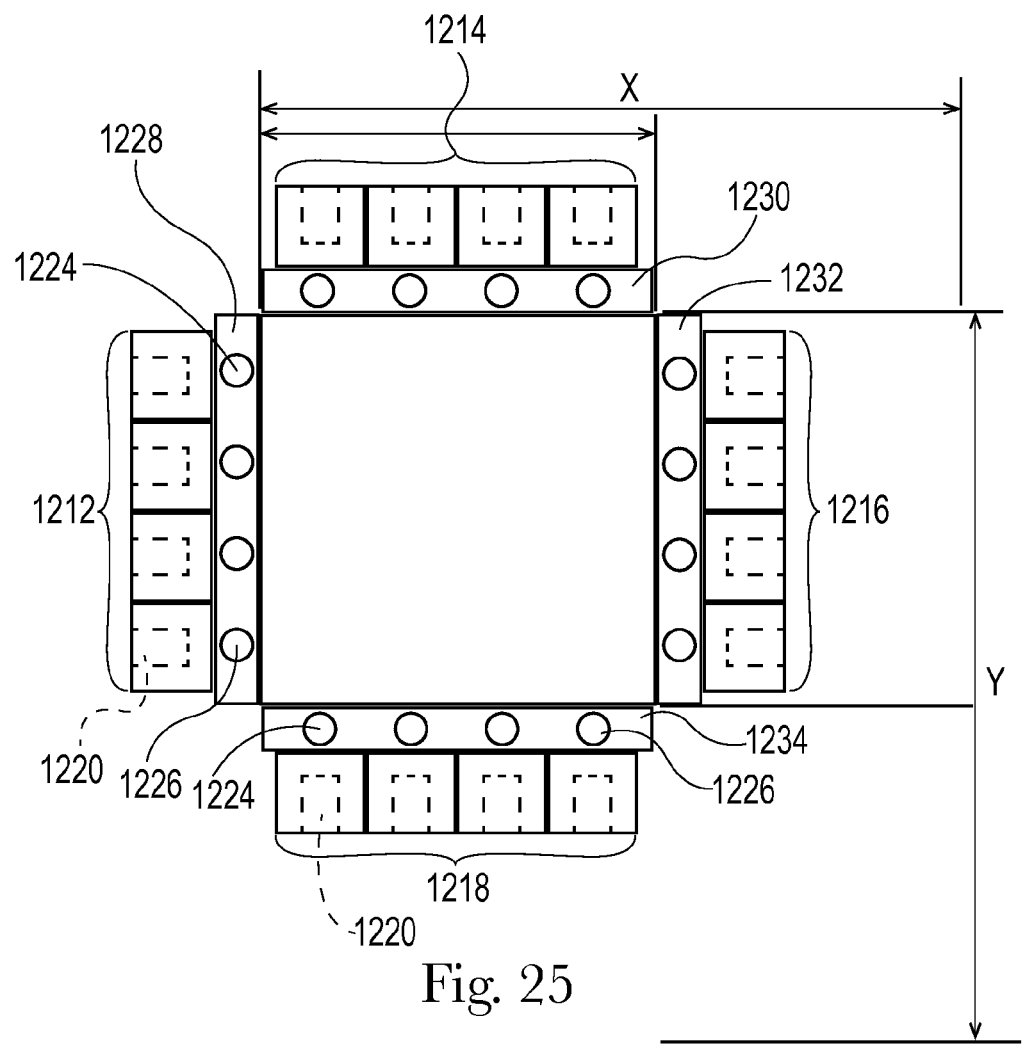
FIG. 25 is a top view similar to FIG. 18, but while no cooling channels are provided in product-specific mold inserts associated with the mold cavities, minimal cooling channels are provided in the form of inlet and outlet cooling fluid lines in the plates to which the product-specific mold inserts are secured. Like FIG. 15.
Figure 26:
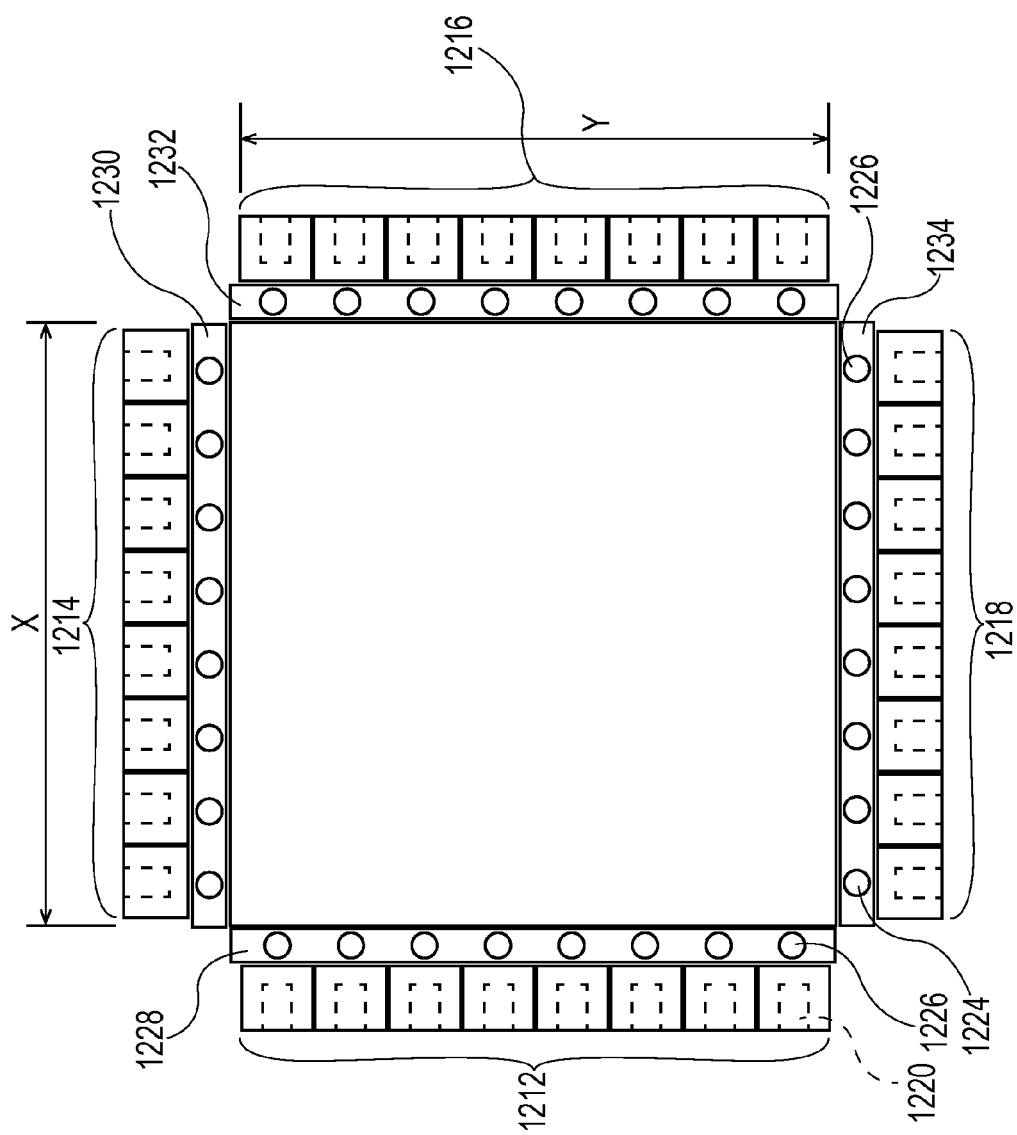
FIG. 26 is a top view similar to FIG. 16, but while no cooling channels are provided in product-specific mold inserts associated with the mold cavities, minimal cooling channels are provided in the form of inlet and outlet cooling fluid lines in the plates to which the product-specific mold inserts are secured. Like FIG. 16.
Figure 27:
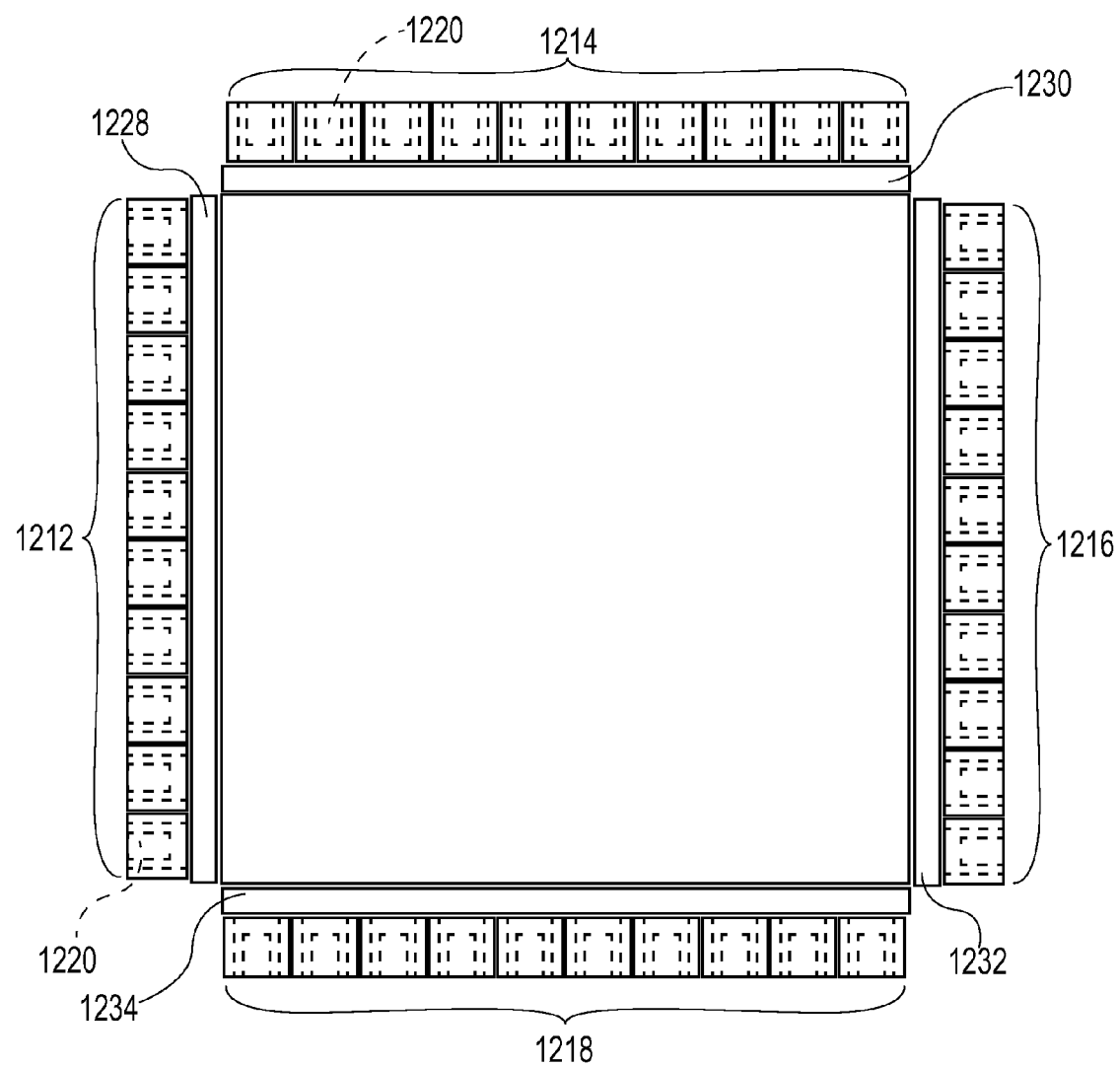
FIG. 27 is a top view similar to FIG. 25, with no cooling channels provided in product-specific mold inserts associated with the mold cavities and no inlet or outlet cooling feed lines in the plates to which the product-specific mold inserts are secured, even further increasing the number of mold cavities in an overall mold having the same length and height dimensions as the conventional multi-cavity mold illustrated in FIG. 24.

In a preferred embodiment, illustrated in FIGS. 25 and 26, cooling channels may be eliminated from the product-specific mold inserts 1212, 1214, 1216, 1218, but minimal cooling lines in the form of inlet and outlet lines 1224, 1226 may still be provided in the plates 1228, 1230, 1232, 1234 to which the mold inserts are secured. Alternately, as illustrated in FIG. 27, similar to FIG. 19, the cooling channels or inlet and outlet lines may be entirely eliminated not only from the product-specific mold inserts 1212, 1214, 1216, 1218, but also from the plates 1228, 1230, 1232, 1234 to which the mold inserts are secured. This can have the benefit of even further increasing the number of mold cavities 1220 that can be provided on each face of a cube mold for the same length and height of a face of a conventional cube mold. For instance, FIG. 27 illustrates a ten-by-ten array of mold cavities in each mold face, both the product-specific mold inserts 1212, 1214, 1216, 1218 and the plates to which the mold inserts are attached being free of any cooling channels or inlet or outlet lines, in the same footprint of a conventional cube mold with only a four-by-four array of mold cavities on each face, but with cooling channels 1222 and the inlet and outlet lines 1224, 1226.

A cooling system can be entirely confined within a variable position section and not extend into any multi-cavity injection mold inserts of the variable position section. In the case of a variable position mold system such as a cube mold 1210, which has a movable central section 1236, the ability to draw and hold a vacuum (as is necessary for most evaporative cooling systems) is a complicating factor, due to the difficulty of holding a vacuum in exposed faces. However, the elimination of cooling channels in the product-specific multi-cavity mold inserts 1212, 1214, 1216, 1218 means that evaporative cooling systems may be contained entirely within the supporting plates 1228, 1230, 1232, 1234 to which the mold inserts 1212, 1214, 1216, 1218 are attached. It is considerably easier to maintain a vacuum in such a wholly-contained cooling system which can be provided in the form of a simple manifold in the inner portion of a rotating cube mold, thereby making evaporative cooling with exotic and more effective cooling fluids more practical for commercial use, without fear of leakage. The contained cooling systems may be sealed by permanent, static seals that need not be disassembled during maintenance or changing of molds. Furthermore, evaporative cooling systems require the coolant to condense in the mold inserts. Gravitational forces then cause the condensed coolant to flow into reservoirs, and then be re-circulated to cycle through the evaporative process. This process is repeated on a continuous basis. In the case of a rotational mold, centrifugal forces also act on the coolant, and in the case of complicated mold insert geometry, the coolant can become trapped in the insert and not flow properly into the reservoirs for re-circulation. These areas containing trapped coolant will then not provide cooling and result in "hot spots" in the mold inserts. In the case of simplified cooling systems, the centrifugal forces can be easily compensated for and proper flow achieved, thereby achieving efficient cooling in a evaporative cooling system.

Figure 28:
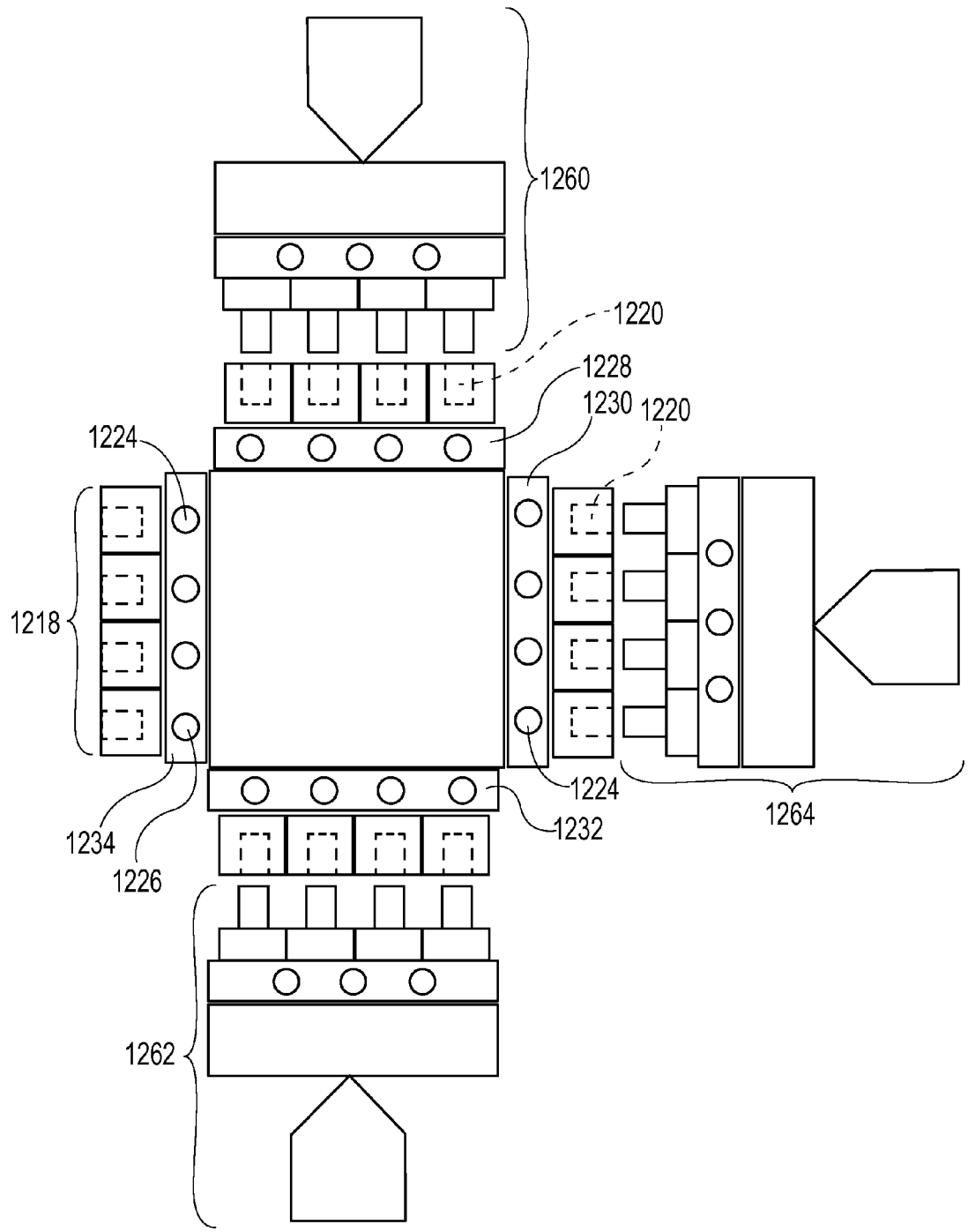
FIG. 28 is a top view of a three-shot injection molding configuration with the cube mold of FIG. 25, wherein first and second molding stations are oppositely-disposed to one another along a machine axis and a third molding station is disposed orthogonally to the first and second molding stations.
Figure 29:
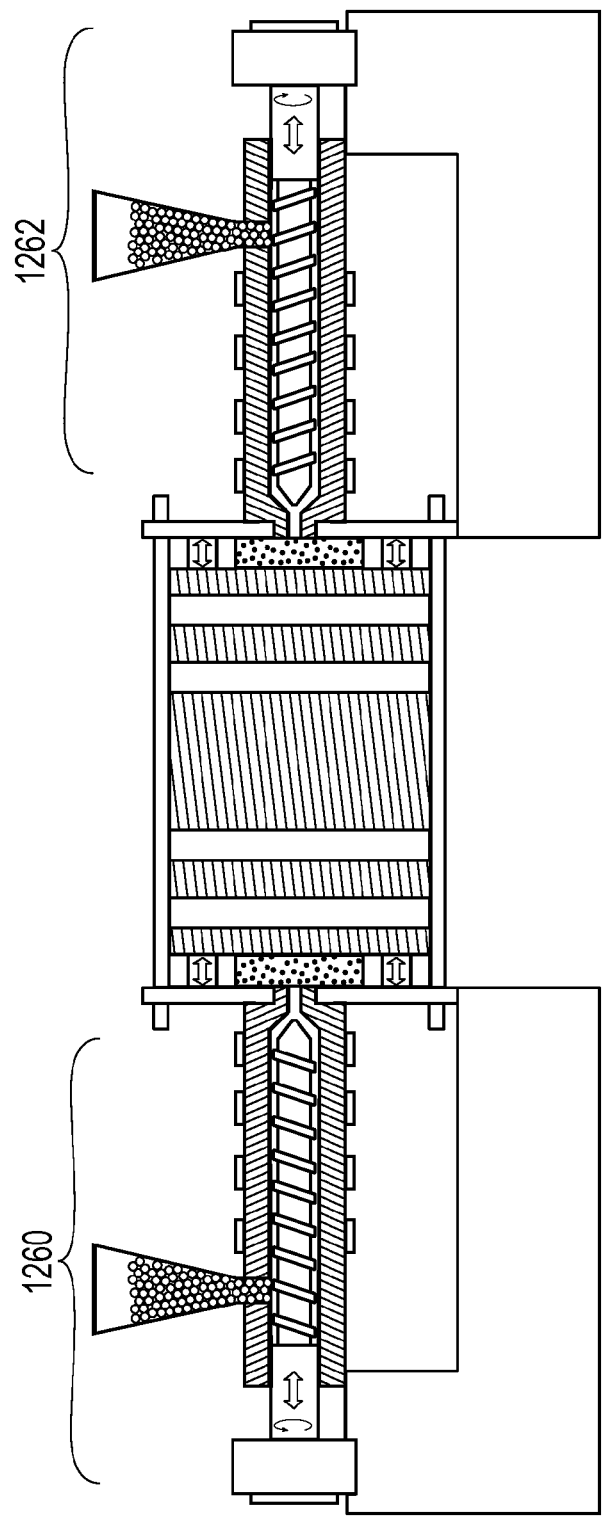
FIG. 29 is a side cross-sectional view illustrating first and second injection molding stations for a variable position injection molding system.

Turning to FIG. 28, a cube mold system operated to rotate at 90° intervals is illustrated, with operations occurring not only on opposing faces that are in alignment with first and second molding stations along a machine axis, but simultaneously on other faces of that same cube mold 1210. For instance, a third injection molding station 1264 is provided that can deliver a third mold shot at a position orthogonal to the first and second molding stations 1260, 1262. The product-specific mold inserts 1212, 1214, 1216, 1218 are made of a low hardness, high thermal conductivity material, such as aluminum or any of the other materials described herein as being suitable for use in a low constant pressure injection molding system. As explained above, the high thermal conductivity of this metallurgy permits the product-specific mold inserts 1212, 1214, 1216, 1218 to be free of cooling channels, with all cooling lines being contained in the plates 1228, 1230, 1232, 1234 to which the product-specific mold inserts 1212, 1214, 1216, 1218 are mounted.

Despite the third molding operation being performed at a face of the cube mold 1210 orthogonal to the machine axis, since the third injection shot is at a low and substantially constant pressure, the clamping force required between the third mold station and the cube mold is relatively small, compared to a high pressure molding scenario that requires a strong clamping mechanism external to the cube applying a mechanical wedge or lock that serves to wedge or trap together the plates in the face of the cube immediately facing that third molding station. The lower pressure of the third mold shot also increases the capacity of the third mold shot because problems attributable to asymmetry of the injection molding stations do not manifest themselves at the low pressures the third injection mold station 1264 operates. It is recognized that the third shot can sequentially be introduced to a given set of mold cavities earlier in time than the second shot, since the third injection molding station 1264 is arranged intermediate the first and second injection molding stations 1260, 1262, so the designation of "first", "second", or "third" as used herein is not intended to denote a particular order of operations, absent a specific additional indication that a particular of operations is intended. Each of the first, second, and third molding stations 1260, 1262, 1264 may include a delivery system having an injection unit operable to deliver molten material to a manifold in fluid communication with the injection unit.

In various embodiments of variably-positionable mold systems of the present disclosure, one or more of any of the operations (related to the injection molding process), as disclosed herein or as known in the art, can be performed on some or all of the cavities on one or more of any of the faces of a cube mold, in any workable sequence and/or combination, while the mold system is stationary, or as the rotatable mold rotates about an axis, to different orientations. In some examples, such embodiments can be used for multiple-shot molding, with an injection of molten material made at each of multiple orientations for the rotatable mold. In other examples, such embodiments can be used for single-shot molding, with an injection of molten material made at a single orientation for the rotatable mold, and one or more other molding operations (e.g. ejection) performed at one or more other orientations for the rotatable mold.

Figure 30:
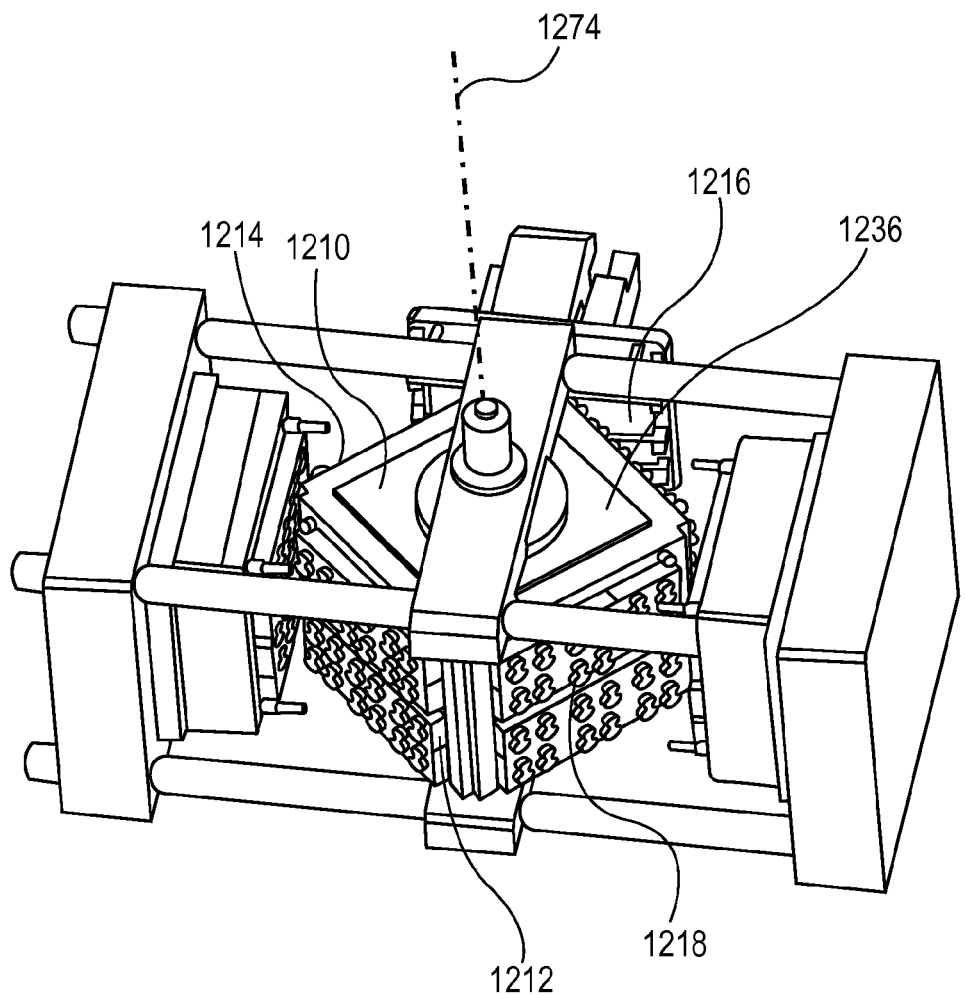
FIG. 30 illustrates opposing first and second injection molding stations in a machine direction, plus a third injection molding station orthogonal to the first and second injection molding stations, for a variable position injection molding system.
Figure 31:
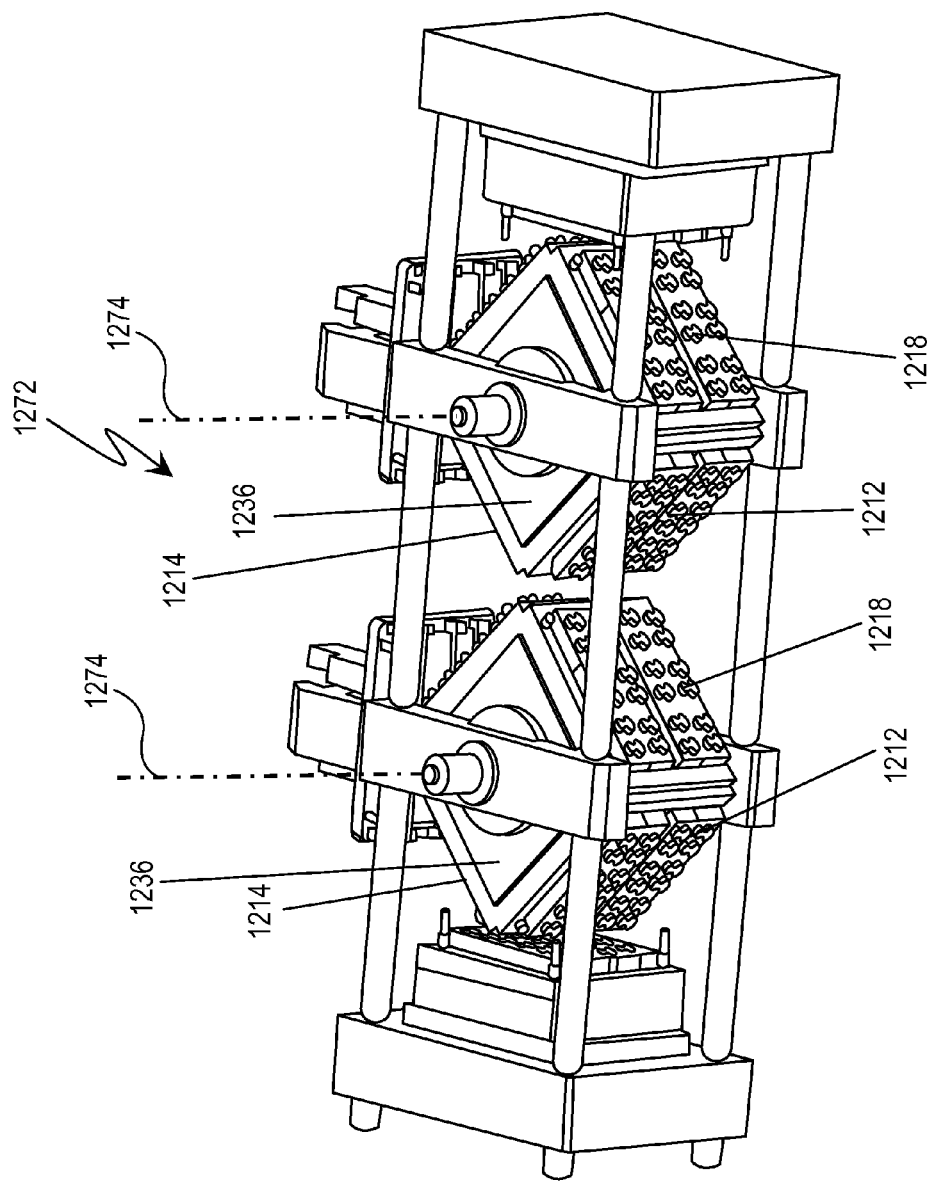
FIG. 31 illustrates a dual cube mold variable position injection mold system with opposing first and second injection molding stations in a machine direction, plus third and fourth injection molding stations, one associated with each of the two cube molds, and orthogonal to the first and second injection molding stations.
Figure 32:
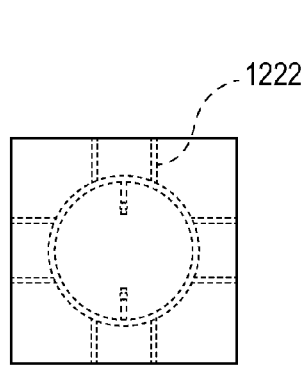
FIG. 32 is a top view of a rotatable section of a cube mold having a cooling system therein that delivers cooling fluid to and from cooling lines within a plate to which a product-specific multi-cavity mold insert may be secured.
Figure 33:
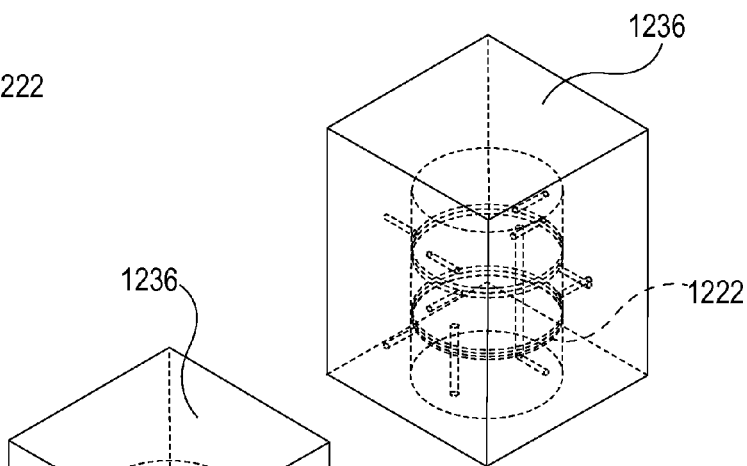
FIG. 33 is a perspective view of the rotatable section of the cube mold of FIG. 32.
Figure 34:
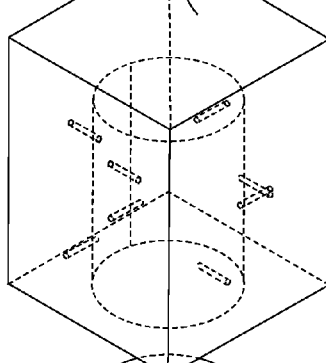
FIG. 34 is an exploded view of the rotatable section of the cube mold and the cooling system of FIG. 32.
Figure 35:
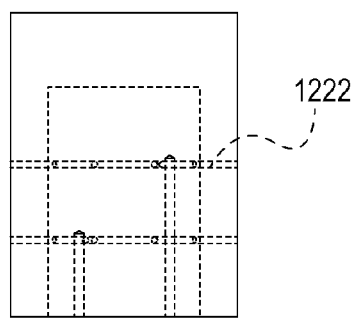
FIG. 35 is a front view of the rotatable section of the cube mold of FIG. 32.
Figure 36:
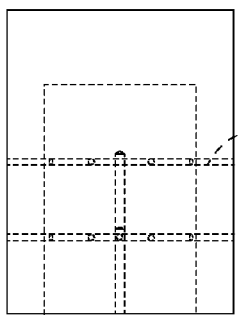
FIG. 36 is a side view of the rotatable section of the cube mold of FIG. 32.
Figure 37:
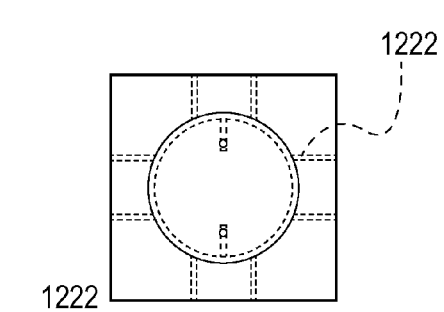
FIG. 37 is a bottom view of the rotatable section of the cube mold of FIG. 32.

In addition to a single cube mold system, such as illustrated in FIG. 30, the low hardness, high thermal conductivity product-specific mold inserts 1212, 1214, 1216, 1218 may be provided on a double cube mold system 1272, such as illustrated in FIG. 31. Alternate cube arrangements are possible, such as rows of stacked, independently-rotatable cube molds, and cube molds that rotate on multiple axes.

The lighter weight metals used in multi-cavity, variable position molds when injection molding at low pressure reduce the mass of the entire cube mold 1210, and particularly in the region of the faces of the cube mold 1210 farthest from the axis of rotation 1274 of the cube mold. This reduces a lever arm effect of conventional higher-mass mold inserts that were necessary to withstand higher molding pressures, such mold inserts made of metals having low thermal conductivity, for example tool steel. As discussed above, by eliminating or reducing the number and complexity of cooling channels within the product-specific mold inserts associated with the mold cavities 1220, the overall size of the mold faces can also be reduced while preserving the same number, and dimensions (e.g., diameter and depth) of mold cavities 1220. Alternately, the overall size of the mold faces can be substantially preserved, while decreasing pitch between mold cavities and increasing the number of mold cavities to substantially increase the number of parts that can be molded in each cycle. With more mold cavities, and lighter weight metal, the lever arm effect is reduced and the power requirements for accelerating and decelerating the cube mold to rotate it to successive positions are reduced. The speed of rotation of the cube mold 1220 may also be increased, reducing the time necessary for the cube mold 1220 to rotate from a first position to a second position, from the second to a third position, from the third position to a fourth position, and from the fourth position back to the first position. A time savings in the rotation of each quarter turn of a cube mold that rotates at 90° intervals is potentially very significant, because such a time savings is multiplied by four to realize the entire time savings for a given cycle or complete revolution of the cube mold 1220.

The reduction in energy necessary to rotate a lower mass cube mold 1220 may be derived from the reduced torque or lever arm applied by the lower mass at a given distance from the axis of rotation 1274 of the cube mold 1220. Where force is equal to mass times acceleration, torque can be expressed as follows: Torque equals Force*moment arm*$\sin(\theta)$ (or T=(F)(r)$\sin(\theta)$, where $\theta$ is the angle between the Force vector (F) and the moment arm (r). For a case of $\theta=90°$, $\sin(\theta)=1$, so T=Fr.

In the case of a rotatable cube mold 1220, which may be considered a rigid body rotating about a vertical axis 1274, angular displacement being expressed as $\theta$, with $2\pi$ radians being a full revolution. Angular velocity, $\omega$, is in units of radians per second, and angular acceleration, $\alpha$, is $\delta\omega/\delta t$ (rate of change of angular velocity over time). I is the rotational moment of inertia of a body, and $I=\Sigma m_i r_i^2$, the summation of the products of the mass of each particle in the body by the square of its distance from the axis of rotation 1274 of the body.

$T=I\alpha$

Work $W=T\delta\theta$

Power $P=T\omega$

For conditions of constant angular acceleration, $\theta=\bar{\omega}\tau$, $\bar{\omega}=(\omega_0+\omega)/2$ [average angular velocity]

$\omega=\omega_0+\alpha\tau$ $\theta=\omega_0\tau+½\alpha\tau^2$

When changing the mass of the material of the product-specific multi-cavity mold inserts 1212, 1214, 1216, 1218 to a lower mass metal, such as Aluminum or other suitable high thermal conductivity material, which is made possible by performing injection molding at low constant pressure according to the teachings of the present disclosure, the rotational moment of inertia I of the cube mold can be greatly reduced. If the angular acceleration $\alpha$ is kept constant while reducing the moment of inertia I, the Work, or energy necessary to rotate the body, is reduced, since:

$W=T\delta\theta=I\alpha\delta\theta$.

Similarly, if the cube mold having lower mass mold faces is operated at the same angular acceleration $\alpha$ and angular velocity $\omega$ of a conventional cube mold having higher mass mold faces, the power output of the motor used to accelerate and decelerate the cube mold is reduced:

$T\omega=I\alpha\omega$.

Since the moment of inertia for an entire rotatable cube mold 1210 can be expressed as the sum of the moments of inertia of each of its components, even changing the mass of only some of the cube mold's components favorably reduces the overall moment of inertia. For instance, if the components on the faces of the cube mold account for half of the total moment of inertia I of the cube mold, reducing the density of the components on the faces to $⅓^{rd}$ of the density (for example by replacing stainless steel face-mounted product-specific multi-cavity mold inserts with aluminum), then the total moment of inertia of the cube mold is reduced to:
(0.5 [core]+(0.5/3)), or 0.67 the moment of inertia of the cube mold having stainless steel face-mounted product-specific multi-cavity mold inserts.

From the relationship $I=\Sigma m_i r_i^2$, decreasing the density of the mold components most distant from the axis of rotation has the most favorable influence in reduction of overall moment of inertia of a cube mold. This is due to the fact that the per-volume contribution of each component of the cube mold to the overall moment of inertia is driven by the square of the distance r of that component to the axis of rotation.

FIG. 38 illustrates a top view of multi-faced cube mold with all mold faces and the central rotatable section of the cube mold made of a low thermal conductivity metal, such as tool steel, with dark shading indicating relatively high mass metal. As can be appreciated from the foregoing discussion, with FIG. 39 illustrating a top view of a multi-faced cube mold with mold faces made of metal having a high thermal conductivity, such as Aluminum, with light shading indicating relative low mass metal, the cube mold of FIG. 39 has a lower overall moment of inertia than the cube mold of FIG. 38, and requires lower power to accelerate and decelerate the cube mold as it rotates from one position to another.

FIG. 40 is a top view of a multi-faced cube mold with not only mold faces being made of metal having a high thermal conductivity, but with its central rotatable section also made of metal having a high thermal conductivity, with light shading indicating relative low mass metal. The overall moment of inertia of the cube mold of FIG. 40 and power requirements to accelerate and decelerate the cube mold as it rotates from one position to another are even lower than the cube mold of FIG. 39. Notably, the reduction of moment of inertia by also reducing the mass of the central rotatable section, as in FIG. 40, would be less per unit mass of material than the reduction in moment of inertia per unit mass of material realized by reducing the mass of the product-specific multi-cavity mold inserts 1212, 1214, 1216, 1218 in the faces of the cube mold (i.e., the reduction in moment of inertia per unit mass of material removed in comparing the cube mold of FIG. 39 to the cube mold of FIG. 38 is more dramatic than the reduction in moment of inertia per unit mass of material removed when comparing the cube mold of FIG. 40 to the cube mold of FIG. 39).

Figure 20:
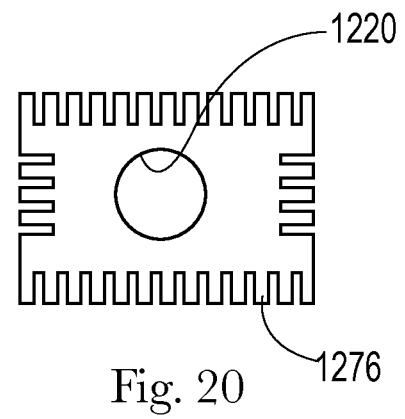
FIG. 20 is a front view of a portion of a low hardness, high thermal conductivity mold insert having a single cavity for a conventional multi-cavity mold of the present disclosure, which mold insert is provided with a plurality of cooling fins.
Figure 21:
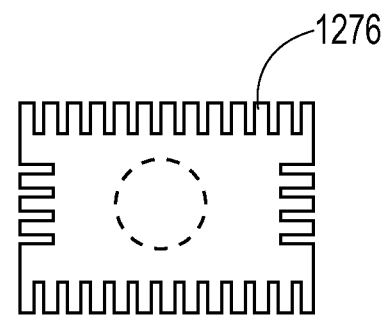
FIG. 21 is a rear view of the portion of the low hardness, high thermal conductivity mold insert illustrated in FIG. 20.
Figure 22:
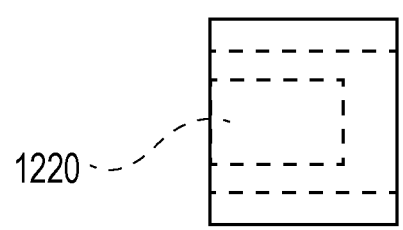
FIG. 22 is a right side view of the portion of the low hardness, high thermal conductivity mold insert illustrated in FIG. 20.
Figure 23:
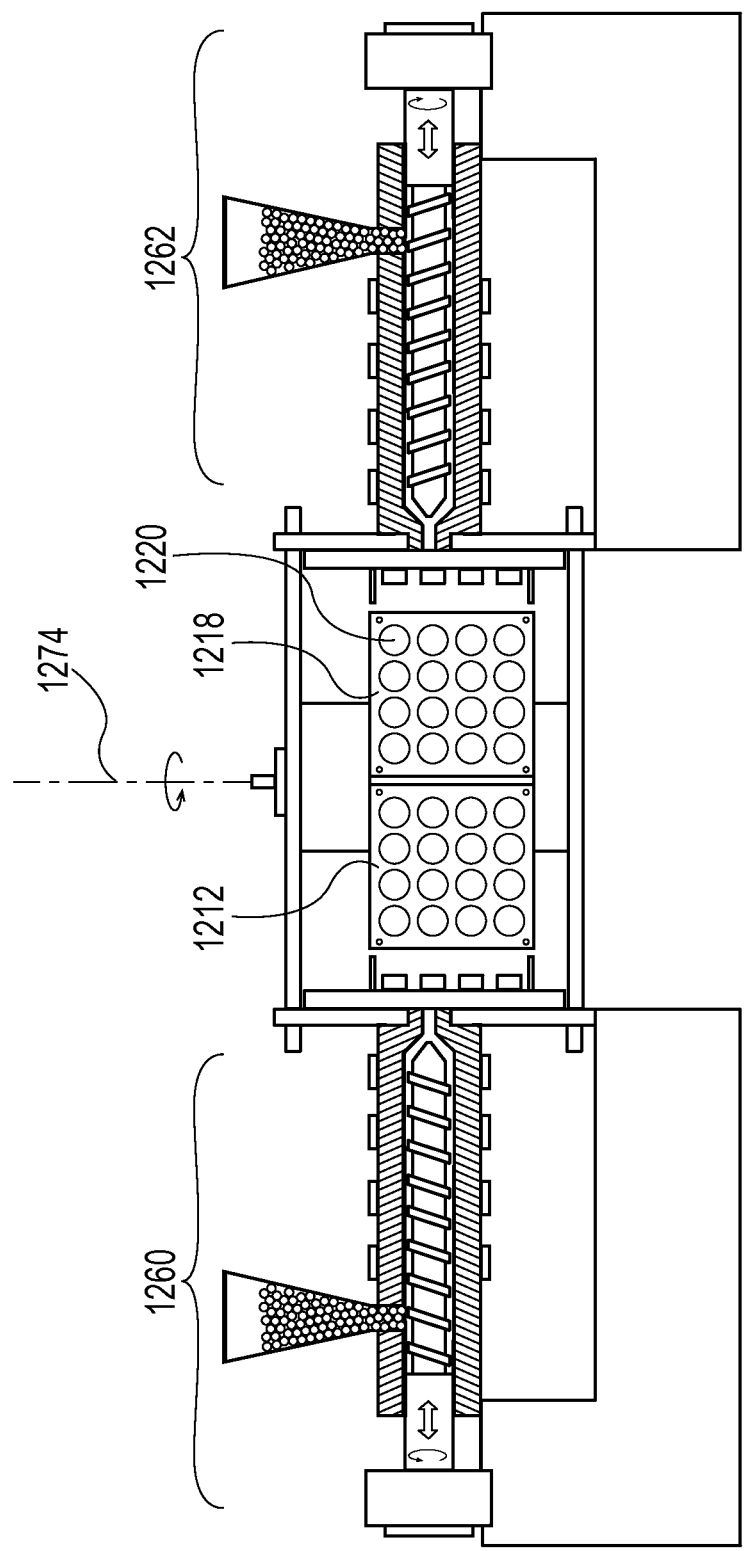
FIG. 23 is a front view, partially in cross-section, of a variable-position, single cube mold system of the present disclosure.

As discussed above, performing injection molding at low constant pressure in accordance with the present disclosure permits the use of lower mass metals that have higher thermal conductivity, thereby simplifying the complexity of cooling systems within the product-specific mold inserts 1212, 1214, 1216, 1218 received on the faces of a cube mold, and the plates of the rotatable section of the cube mold to which the mold inserts are secured. In some cases, the cooling channels can be eliminated altogether, as illustrated in FIGS. 18-22 and 27. To facilitate and expedite cooling when cooling fluid channels are reduced or eliminated, a plurality of cooling fins 1276 may be provided on exposed surfaces of the mold, as illustrated in FIGS. 20 and 21.

As a result of the space savings of minimizing or eliminating cooling channels from the mold inserts, the pitch between mold cavities of the same dimensions (for example diameter and depth) can be reduced, either accommodating a greater number of mold cavities per mold face (thereby significantly increasing number of products output per complete cycle or revolution of the cube mold), or reducing the overall footprint of each mold face, permitting the rotatable central portion of the cube mold to be made smaller as well, as depicted in FIGS. 15, 18, 25, and 41, while maintaining at least the same number of mold cavities per mold face.

If the rotational moment of inertia of a cube mold was expressed as that for a cylinder of radius $R_1$ (inner) and $R_2$ (outer) rotating about its longitudinal central axis, its moment of inertia $I_1 = M(R_1^2 + R_2^2)/2$. If each of the radii R values is reduced by one-half, i.e., $(R_3 = R_1/2, R_4 = R_2/2)$, its rotational moment of inertia I is reduced by ¼.

$$I_1 = M(R_1^2 + R_2^2)/2$$

$$I_2 = M(R_3^2 + R_4^2)/2 = M((R_1/2)^2 + (R_2/2)^2)/2 = M(R_1^2/4 + R_2^2/4)/2 = \tfrac{1}{4}M(R_1^2 + R_2^2)/2 = \tfrac{1}{4}I_1$$

Mass can also be reduced by footprint size reductions.

FIG. 41 is a top view of a multi-faced cube mold with both its mold faces and central rotatable section made of metal having a high thermal conductivity and, due to minimization or elimination of cooling channels, a reduced overall footprint as compared to the multi-faced cube mold of FIG. 40.

If the cube mold of FIG. 38 were a stainless steel mold having a moment of inertia $I_0$, changing the material of all mold faces and the central rotatable section of the cube mold to a lower mass metal, as illustrated in FIG. 40, the metal being Aluminum, results in a moment of inertia $I_1$ that is one-third the moment of inertia of $I_0$. If the overall footprint of the cube mold is reduced, as depicted in FIG. 41, such that what is considered the overall radius R of the mold is reduced by one-half, the resulting moment of inertia $I_2$ compares to $I_1$ and $I_0$ as follows:

$$I_2 = I_1/4 = I_0/12$$

Recall that for conditions of constant angular acceleration:

$$\Theta = \bar{\omega}\tau, \bar{\omega} = (\omega_0 + \omega)/2 \text{ [average angular velocity]}$$

$$\omega = \omega_0 + \alpha\tau$$

$$\Theta = \omega_0\tau + \tfrac{1}{2}\alpha\tau^2$$

For a cube mold application, we'll assume a desired rotation of 90 degrees, during half of which we apply a constant Torque for acceleration, the latter half for which we apply the same Torque in the opposite direction to brake the cube to a stop. To simplify, we'll solve for only the acceleration portion, thus to $\Theta = 45$ degrees $= 2\pi/8 = \pi/4$ radians.

$$\Theta = \omega_0\tau + \tfrac{1}{2}\alpha\tau^2$$

$$\omega_0 = 0, \text{ thus } \Theta = \tfrac{1}{2}\alpha\tau^2$$

$$\text{Solving for } \tau, \tau = \sqrt{(2\Theta/\alpha)} = \sqrt{(2\Theta/(T/\Sigma m_i r_i^2))} = \sqrt{((2\Theta \Sigma m_i r_i^2)/T)}$$

If $\Theta$ and T input remain constant, adjusting the effective R has a linear impact on time to rotate through the same angular displacement. Thus, reducing effective R by a factor of ½, $t_2 = t_1 * \tfrac{1}{2}$. Thus, a reduction in time due to rotation (and as a result, overall cycle time) is directly proportional to rotational inertia of the product-specific multi-cavity mold inserts.

Low constant pressure injection molding with variable position molds according to the present disclosure can further be used with co-injection techniques, such as described in U.S. patent application Ser. No. 13/774,692, which is incorporated herein by reference. Examples of multi-material configurations of products that could be co-injected consistent with these scenarios using the system and method of the present disclosure are illustrated and described in US Publication Nos. 2005/0170114 A1, which is incorporated herein by reference.

The disclosed low constant pressure injection molding methods and machines advantageously reduce cycle time for the molding process while increasing part quality. Moreover, the disclosed low constant pressure injection molding machines may employ, in some embodiments, electric presses, which are generally more energy efficient and require less maintenance than hydraulic presses. Additionally, the disclosed low constant pressure injection molding machines are capable of employing more flexible support structures and more adaptable delivery structures, such as wider platen widths, increased tie bar spacing, elimination of tie bars, lighter weight construction to facilitate faster movements, and non-naturally balanced feed systems. Thus, the disclosed low constant pressure injection molding machines may be modified to fit delivery needs and are more easily customizable for particular molded parts.

Additionally, the disclosed low constant pressure injection molding machines and methods allow the molds to be made from softer materials (e.g., materials having a Rc of less than about 30), which may have higher thermal conductivities (e.g., thermal conductivities greater than about 20 BTU/HR FT ° F.), which leads to molds with improved cooling capabilities and more uniform cooling. Because of the improved cooling capabilities, the disclosed low constant pressure injection molds may include simplified cooling systems. Generally speaking, the simplified cooling systems include fewer cooling channels and the cooling channels that are included may be straighter, having fewer machining axes. One example of an injection mold having a simplified cooling system is disclosed in U.S. Patent Application No. 61/602,781, filed Feb. 24, 2012, which is hereby incorporated by reference herein.

The lower injection pressures of the low constant pressure injection molding machines allow molds made of these softer materials to extract 1 million or more molding cycles, which would not be possible in conventional high variable pressure injection molding machines as these materials would fail before 1 million molding cycles in a high pressure injection molding machine.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low, substantially constant pressure molding process. While particular reference has been made herein to products for containing consumer goods or consumer goods products themselves, it should be apparent that the molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

Part, parts, or all of any of the embodiments disclosed herein can be combined with part, parts, or all of other embodiments known in the art, including those described below.

Embodiments of the present disclosure can be used with embodiments for injection molding at low constant pressure, as disclosed in U.S. patent application Ser. No. 13/476,045 filed May 21, 2012, entitled "Apparatus and Method for Injection Molding at Low Constant Pressure" and published as US 2012-0294963 A1, which is hereby incorporated by reference.

Embodiments of the present disclosure can be used with embodiments for pressure control, as disclosed in U.S. patent application Ser. No. 13/476,047 filed May 21, 2012, entitled "Alternative Pressure Control for a Low Constant Pressure Injection Molding Apparatus" and published as US 2012-0291885 A1, which is hereby incorporated by reference.

Embodiments of the present disclosure can be used with embodiments for simplified cooling systems, as disclosed in U.S. patent application Ser. No. 13/774,571 filed Feb. 22, 2013, entitled "Injection Mold Having a Simplified Cooling System", which is hereby incorporated by reference.

Embodiments of the present disclosure can be used with embodiments for non-naturally balanced feed systems, as disclosed in U.S. patent application Ser. No. 13/476,073 filed May 21, 2012, entitled "Non-Naturally Balanced Feed System for an Injection Molding Apparatus" and published as US 2012-0292823 A1, which is hereby incorporated by reference.

Embodiments of the present disclosure can be used with embodiments for injection molding at low, substantially constant pressure, as disclosed in U.S. patent application Ser. No. 13/476,197 filed May 21, 2012, entitled "Method for Injection Molding at Low, Substantially Constant Pressure" and published as US 2012-0295050 A1, which is hereby incorporated by reference.

Embodiments of the present disclosure can be used with embodiments for injection molding at low, substantially constant pressure, as disclosed in U.S. patent application Ser. No. 13/476,178 filed May 21, 2012, entitled "Method for Injection Molding at Low, Substantially Constant Pressure" and published as US 2012-0295049 A1, which is hereby incorporated by reference.

Embodiments of the present disclosure can be used with embodiments for co-injection processes, as disclosed in U.S. patent application Ser. No. 13/774,692 filed Feb. 22, 2013, entitled "High Thermal Conductivity Co-Injection Molding System", which is hereby incorporated by reference.

Embodiments of the present disclosure can be used with embodiments for molding with simplified cooling systems, as disclosed in U.S. patent application Ser. No. 13/601,359 filed Aug. 31, 2012, entitled "Injection Mold Having a Simplified Evaporative Cooling System or a Simplified Cooling System with Exotic Cooling Fluids", which is hereby incorporated by reference.

Embodiments of the present disclosure can be used with embodiments for molding thinwall parts, as disclosed in U.S. patent application Ser. No. 13/476,584 filed May 21, 2012, entitled "Method and Apparatus for Substantially Constant Pressure Injection Molding of Thinwall Parts", which is hereby incorporated by reference.

Embodiments of the present disclosure can be used with embodiments for molding with a failsafe mechanism, as disclosed in U.S. patent application Ser. No. 13/672,246 filed Nov. 8, 2012, entitled "Injection Mold With Fail Safe Pressure Mechanism", which is hereby incorporated by reference.

Embodiments of the present disclosure can be used with embodiments for high-productivity molding, as disclosed in U.S. patent application Ser. No. 13/682,456 filed Nov. 20, 2012, entitled "Method for Operating a High Productivity Injection Molding Machine", which is hereby incorporated by reference.

Embodiments of the present disclosure can be used with embodiments for molding certain thermoplastics, as disclosed in U.S. patent application 61/728,764 filed Nov. 20, 2012, entitled "Methods of Molding Compositions of Thermoplastic Polymer and Hydrogenated Castor Oil", which is hereby incorporated by reference.

Embodiments of the present disclosure can be used with embodiments for runner systems, as disclosed in U.S. patent application 61/729,028 filed Nov. 21, 2012, entitled "Reduced Size Runner for an Injection Mold System", which is hereby incorporated by reference.

Embodiments of the present disclosure can be used with embodiments for controlling molding processes, as disclosed in U.S. Pat. No. 5,716,561 issued Feb. 10, 1998, entitled "Injection Control System", which is hereby incorporated by reference.

Embodiments of the present disclosure can be used with embodiments for controlling molding processes, as disclosed in U.S. Pat. No. 5,728,329 issued Mar. 17, 1998, entitled "Method and Apparatus for Injecting a Molten Material into a Mold Cavity", which is hereby incorporated by reference.

Embodiments of the present disclosure can also be used with embodiments of molding processes and equipment that use variable-positionable mold systems with rotatable molds, including, for example, such processes and equipment as disclosed in: U.S. Pat. No. 7,608,212 issued Oct. 27, 2009, entitled "Method for the production of a molded part"; U.S. Pat. No. 7,585,447 issued Sep. 8, 2009, entitled "Tool with closing mechanism and method of manufacturing preferably plastic parts with hinges"; U.S. Pat. No. 7,497,676 issued Mar. 3, 2009, entitled "Procedure and machinery for the molding of an assembled object"; U.S. Pat. No. 7,452,202 issued Nov. 18, 2008, entitled "Machinery for the molding and assembling of an assembled object"; U.S. Pat. No. 7,361,011 issued Apr. 22, 2008, entitled "Ejector system"; U.S. Pat. No. 7,320,591 issued Jan. 22, 2008, entitled "Procedure and machine for multi-component molding"; U.S. Pat. No. 7,150,845 issued Dec. 19, 2006, entitled "Mould with turnable middle section"; and U.S. Pat. No. 7,081,222 issued Jul. 25, 2006, entitled "Procedure and machinery for the molding and assembling of an assembled object"; each of which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection molding system comprising:
    at least one multi-cavity injection mold insert made of a metal having a thermal conductivity of more than 30 BTU/HR FT ° F.;
    a first injection system operable to deliver molten material at a substantially constant pressure of between about 6.89 megapascals (1,000 psi) and about 103.42 megapascals (15,000 psi) to a set of mold cavities of the at least one multi-cavity injection mold insert when in fluid communication therewith;
    a second injection system operable to deliver molten material at a substantially constant pressure of between about 6.89 megapascals (1,000 psi) and about 103.42 megapascals (15,000 psi) to the set of mold cavities of the at least one multi-cavity injection mold insert when in fluid communication therewith;
    a variable-position section to which a multi-cavity injection mold insert is secured, the variable-position section operable to position the set of mold cavities of the at least one multi-cavity injection mold insert into fluid communication with the first injection system when in a first orientation and to position the set of the at least one multi-cavity injection mold insert into fluid communication with the second injection system when in a second orientation; and
    a cooling system that is entirely confined within the variable position section and does not extend into any multi-cavity injection mold inserts of the variable position section.

2. The injection molding system of claim 1, further comprising a third injection system operable to deliver molten material at a substantially constant pressure of between about 6.89 megapascals (1,000 psi) and about 103.42 megapascals (15,000 psi) to the set of mold cavities of the at least one multi-cavity injection mold insert when in fluid communication therewith.

3. The injection molding system of claim 1, wherein the variable-position section is rotatable about a horizontal axis.

4. The injection molding system of claim 1, wherein the variable-position section is a rotatable central section of a cube mold rotatable about a vertical axis.

5. The injection molding system of claim 4, including a plurality of the multi-cavity injection mold inserts, each of the multi-cavity injection mold inserts being secured to a distinct face of the cube mold, with the set of mold cavities in one of the multi-cavity injection mold inserts on one of the faces of the cube mold being in fluid communication with the first injection system while a set of mold cavities in another of the multi-cavity injection mold inserts on another one of the faces of the cube mold is in fluid communication with the second injection system.

6. The injection molding system of claim 5, wherein the first and second injection systems are axially aligned with one another.

7. The injection molding system of claim 6, further comprising a third injection system operable to deliver molten material at a substantially constant pressure of between about 6.89 megapascals (1,000 psi) and about 103.42 megapascals (15,000 psi) to the set of mold cavities of the at least one multi-cavity injection mold insert when in fluid communication therewith, the third injection molding system being orthogonal to the first and second injection systems.

8. The injection molding system of claim 1, wherein the cooling system includes an evaporative cooling system.

9. The injection molding system of claim 1, wherein the variable-position section is operable to position the set of mold cavities to any desired number of orientations.

* * * * *